US010654470B2

(12) United States Patent
Sato

(10) Patent No.: US 10,654,470 B2
(45) Date of Patent: May 19, 2020

(54) VEHICLE CONTROL APPARATUS AND METHOD FOR CONTROLLING VEHICLE

(71) Applicant: FUJI JUKOGYO KABUSHIKI KAISHA, Tokyo (JP)

(72) Inventor: Yutaka Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 19 days.

(21) Appl. No.: 15/248,917

(22) Filed: Aug. 26, 2016

(65) Prior Publication Data
US 2017/0057493 A1 Mar. 2, 2017

(30) Foreign Application Priority Data

Aug. 27, 2015 (JP) ................. 2015-167957

(51) Int. Cl.
B60W 30/02 (2012.01)
B60W 30/045 (2012.01)
B60W 10/184 (2012.01)
B60W 50/00 (2006.01)

(52) U.S. Cl.
CPC .......... B60W 30/02 (2013.01); B60W 10/184 (2013.01); B60W 30/045 (2013.01);
(Continued)

(58) Field of Classification Search
CPC ....... B60W 2520/14; B60W 2720/266; B60W 2720/263; B60W 2520/06
(Continued)

(56) References Cited

U.S. PATENT DOCUMENTS 5,328,255 A 7/1994 Isella
5,762,157 A * 6/1998 Uehara ............... B60T 8/17552
180/197

(Continued)

FOREIGN PATENT DOCUMENTS

DE 3933653 A1 4/1991
JP 04-372448 A 12/1992
(Continued)

OTHER PUBLICATIONS

Office Action for DE Patent Application No. 10-2016-115663.9, dated Jan. 24, 2018, 07 pages of Office Action and 05 pages of English Translation.

Primary Examiner — Khoi H Tran
Assistant Examiner — Rodney P King
(74) Attorney, Agent, or Firm — Chip Law Group

(57) ABSTRACT

A vehicle control apparatus includes an additional yaw moment decider that decides an additional yaw moment based on a yaw rate of a vehicle, a spin tendency determiner that makes a determination as to a spin tendency of the vehicle, a rotation difference decider that decides a rotation difference control amount for controlling a difference in rotation between left and right front wheels of the vehicle so as to reduce the difference in rotation, when the vehicle is determined to have the spin tendency, a rear wheel braking/driving force decider that decides a rear wheel braking/driving force control amount for controlling braking/driving forces of left and right rear wheels of the vehicle based on the additional yaw moment, and a front wheel braking/driving force decider that decides a front wheel braking/driving force control amount for controlling braking/driving forces of the left and right front wheels of the vehicle.

17 Claims, 23 Drawing Sheets

(52) U.S. Cl.
CPC . *B60W 2050/0031* (2013.01); *B60W 2520/06* (2013.01); *B60W 2520/10* (2013.01); *B60W 2520/14* (2013.01); *B60W 2520/20* (2013.01); *B60W 2720/14* (2013.01); *B60W 2720/263* (2013.01); *B60W 2720/266* (2013.01); *B60W 2720/403* (2013.01); *B60W 2720/406* (2013.01); *Y02T 10/7258* (2013.01)

(58) Field of Classification Search
USPC .......................................................... 701/41
See application file for complete search history.

(56) References Cited

U.S. PATENT DOCUMENTS

| | | |
|---|---|---|
| 6,349,256 B1 | 2/2002 | Kin et al. |
| 2003/0130782 A1 | 7/2003 | Check et al. |
| 2005/0107931 A1* | 5/2005 | Shimakage .......... B62D 15/025 701/41 |
| 2006/0015238 A1* | 1/2006 | Motoyama ............. B60K 23/04 701/71 |
| 2009/0037053 A1* | 2/2009 | Yamazaki .............. B60K 23/04 701/41 |
| 2011/0218700 A1* | 9/2011 | Mori ..................... B60W 10/06 701/31.4 |

FOREIGN PATENT DOCUMENTS

| | | |
|---|---|---|
| JP | 07-174689 A | 7/1995 |
| JP | 07-223526 A | 8/1995 |
| JP | 09-099826 A | 4/1997 |
| JP | 11-189063 A | 7/1999 |
| JP | 2010-119204 A | 5/2010 |
| JP | 2011-254590 A | 12/2011 |

* cited by examiner

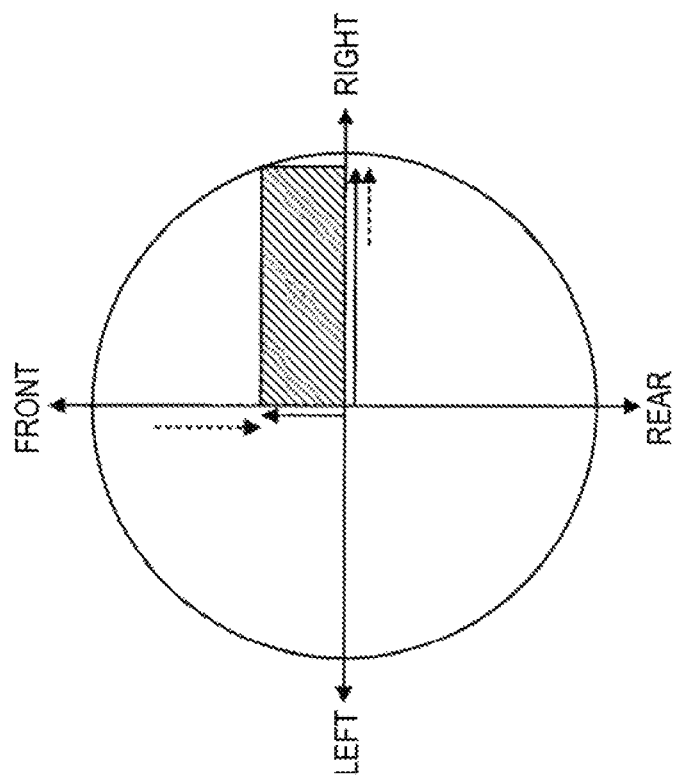
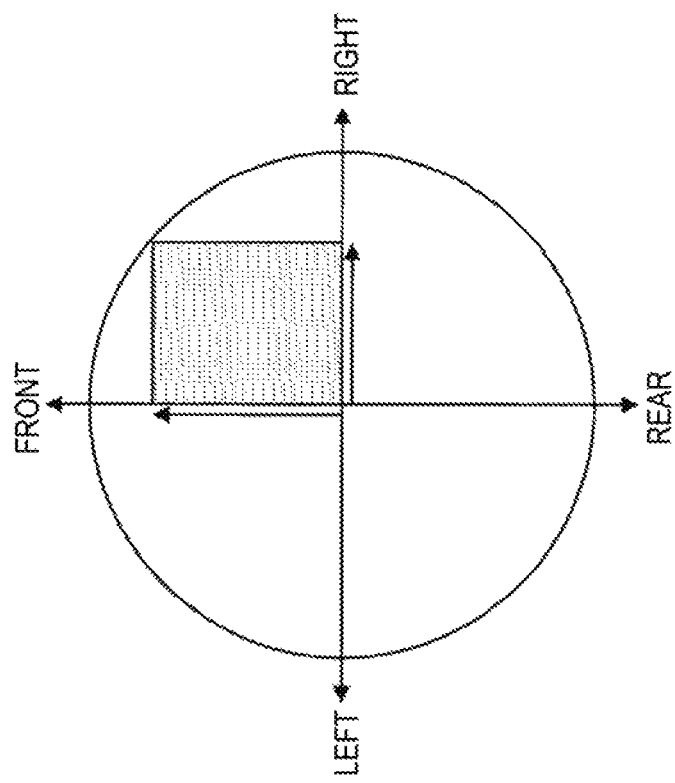
FIG. 6

VEHICLE CONTROL APPARATUS AND METHOD FOR CONTROLLING VEHICLE

CROSS-REFERENCE TO RELATED APPLICATIONS

The present application claims priority from Japanese Patent Application No. 2015-167957 filed on Aug. 27, 2015, the entire contents of which are hereby incorporated by reference.

BACKGROUND

1. Technical Field

The present invention relates to a vehicle control apparatus and a method for controlling a vehicle.

2. Related Art

In recent years, research and development has been conducted concerning techniques for providing assistance in a turn of a vehicle. Examples of such techniques include a technique of controlling braking or driving forces (hereinafter referred to also as "braking/driving forces") of wheels to perform turn control on the vehicle.

Japanese Unexamined Patent Application Publication (JP-A) No. 2011-254590, for example, discloses a technique of controlling braking/driving forces of motors of an electric vehicle so as to make a turning acceleration have a value in accordance with a steering wheel angle, while preventing a slip ratio of each wheel from exceeding a predetermined value.

JP-A No. 2010-119204, for example, discloses a technique, related to a vehicle control apparatus, of varying a control longitudinal force for each wheel in accordance with a steering characteristic determined from an actual yaw moment.

The techniques disclosed in JP-A No. 2011-254590 and JP-A No. 2010-119204, however, have a problem in that an improvement in turning performance of the vehicle and an improvement in stability of the behavior of the vehicle cannot be easily achieved at the same time.

For example, in the case where a parameter for turn control is set in accordance with a high value of a road surface friction coefficient (hereinafter referred to also as "μ"), oversteer occurs more easily and, as a result, the vehicle spins more easily than in the case where this parameter is set in accordance with a low value of μ, when the vehicle is traveling on a low μ road surface.

Conversely, in the case where the parameter for the turn control is set in accordance with a low value of μ, turning performance of the vehicle is reduced compared to the case where this parameter is set in accordance with a high value of μ, when the vehicle is traveling on a high μ road surface.

SUMMARY OF THE INVENTION

It is desirable to provide a novel and improved apparatus and method for controlling a vehicle which are able to achieve at the same time an improvement in the turning performance of the vehicle on a high μ road surface and an improvement in the stability of the behavior of the vehicle on a low μ road surface.

An aspect of the present invention provides a vehicle control apparatus including: an additional yaw moment decider that decides an additional yaw moment based on a yaw rate of a vehicle; a spin tendency determiner that makes a determination as to a spin tendency of the vehicle; a rotation difference decider that decides a rotation difference control amount for controlling a difference in rotation between left and right front wheels of the vehicle so as to reduce the difference in rotation, when the vehicle is determined to have the spin tendency; a rear wheel braking/driving force decider that decides a rear wheel braking/driving force control amount for controlling braking/driving forces of left and right rear wheels of the vehicle based on the additional yaw moment; and a front wheel braking/driving force decider that decides a front wheel braking/driving force control amount for controlling braking/driving forces of the left and right front wheels of the vehicle based on the rotation difference control amount.

Another aspect of the present invention provides a method for controlling a vehicle, the method including: deciding an additional yaw moment based on a yaw rate of a vehicle; making a determination as to a spin tendency of the vehicle; deciding a rotation difference control amount for controlling a difference in rotation between left and right front wheels of the vehicle so as to reduce the difference in rotation, when the vehicle is determined to have the spin tendency; deciding a rear wheel braking/driving force control amount for controlling braking/driving forces of left and right rear wheels of the vehicle based on the additional yaw moment; and deciding a front wheel braking/driving force control amount for controlling braking/driving forces of the left and right front wheels of the vehicle based on the rotation difference control amount.

BRIEF DESCRIPTION OF THE DRAWINGS

FIG. 6 illustrates the relationship between the longitudinal and lateral forces of the rear wheel;

DETAILED DESCRIPTION

Figure 1:
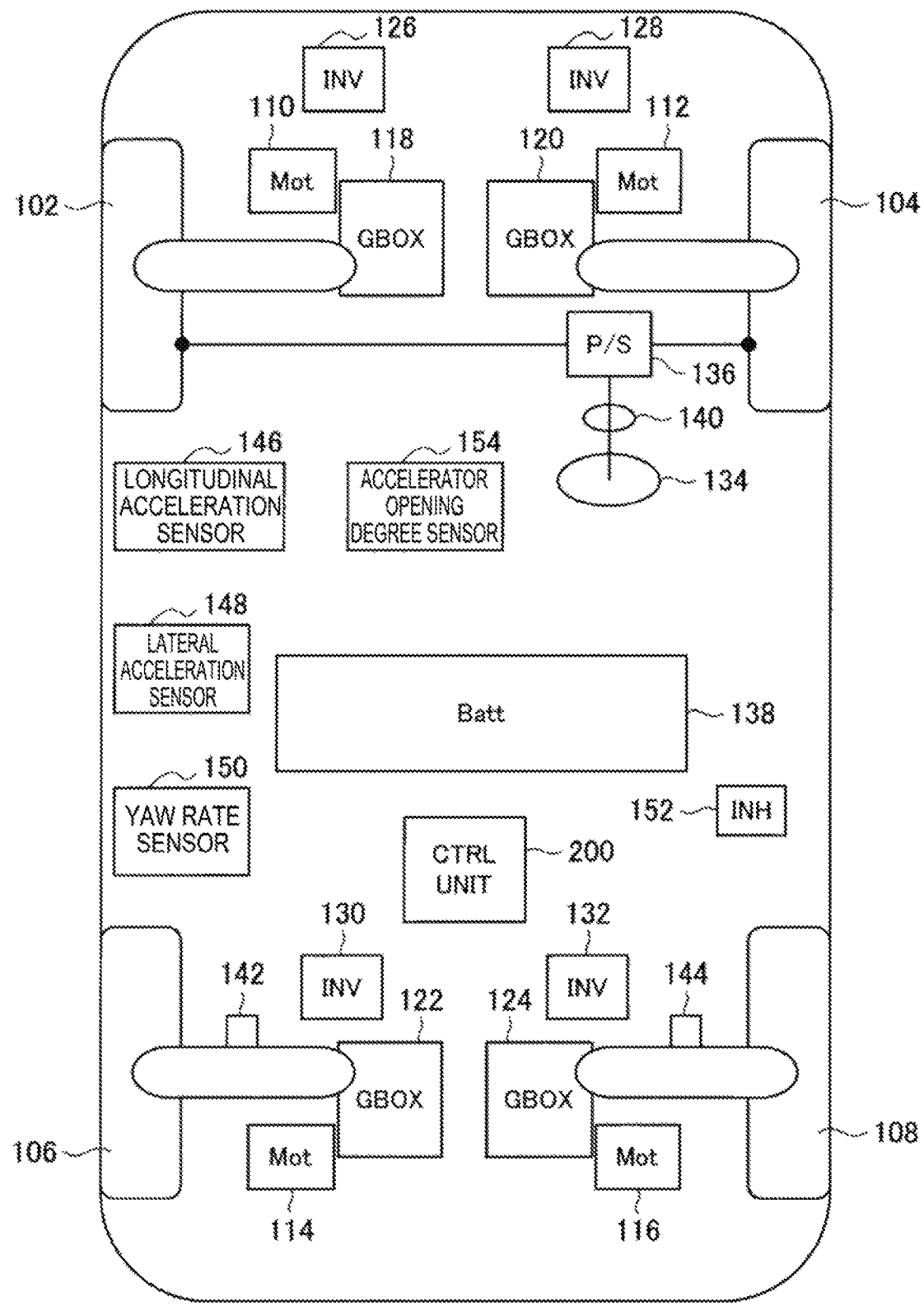
FIG. 1 is a schematic diagram illustrating a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

1. OUTLINE OF VEHICLE CONTROL APPARATUS OF ACCORDING TO ONE IMPLEMENTATION OF PRESENT INVENTION

First, with reference to FIG. 1, the structure of a vehicle 100 including a vehicle control apparatus (hereinafter referred to also as the control apparatus) 200 according to one implementation of the present invention will be described below. FIG. 1 is a schematic diagram illustrating the vehicle 100 according to the present implementation.

Referring to FIG. 1, the vehicle 100 includes a left front wheel 102, a right front wheel 104, a left rear wheel 106, and a right rear wheel 108 (hereinafter referred to also as the wheels 102 to 108); driving force generators (i.e., motors) 110, 112, 114, and 116 (hereinafter referred to also as the motors 110 to 116) that drive the respective wheels 102 to 108; gearboxes 118, 120, 122, and 124 (hereinafter referred to also as the gearboxes 118 to 124) that transfer driving forces from the respective motors 110 to 116 to the respective wheels 102 to 108; inverters 126, 128, 130, and 132 (hereinafter referred to also as the inverters 126 to 132) that control the respective motors 110 to 116; a steering wheel 134 that steers the left front wheel 102 and the right front wheel 104; a power steering mechanism 136; and a battery 138.

In addition, referring to FIG. 1, the vehicle 100 further includes a steering wheel angle sensor 140; wheel speed sensors 142 and 144 that measure the wheel speeds of the left rear wheel 106 and the right rear wheel 108, respectively, (i.e., a vehicle speed V); a longitudinal acceleration sensor 146; a lateral acceleration sensor 148; a yaw rate sensor 150; an inhibitor position sensor (INH) 152; an accelerator opening degree sensor 154; a brake position sensor (not illustrated); motor rotation rate sensors (not illustrated) that measure the rotation rates of the motors 110 to 116; and the control apparatus (i.e., a controller) 200.

As described above, the vehicle 100 is provided with the motors 110 to 116 to individually drive the wheels 102 to 108. Accordingly, a driving torque for each of the wheels 102 to 108 can be controlled individually. Therefore, independently of generation of a vehicle-turning angular velocity (hereinafter referred to also as a yaw rate) by steering of the left and right front wheels 102 and 104, torque vectoring control, which individually drives the wheels 102 to 108 with the motors, can be performed to generate a yaw rate, and assistance in a steering operation can thus be provided. That is, in the vehicle 100 according to the present implementation, control of providing assistance in the steering operation (hereinafter referred to also as turn assist control) is performed by controlling a turning yaw moment (hereinafter referred to also as a yaw moment) based on the yaw rate.

Driving of the motors 110 to 116 is controlled by controlling the inverters 126 to 132 corresponding to the respective motors 110 to 116 based on instructions from the control apparatus 200. Then, driving forces of the motors 110 to 116 are transferred to the respective wheels 102 to 108 through the respective gearboxes 118 to 124.

The power steering mechanism 136 controls the steering angles of the left and right front wheels 102 and 104 through torque control or angle control in accordance with an operation of the steering wheel 134 by a driver.

Figure 2:
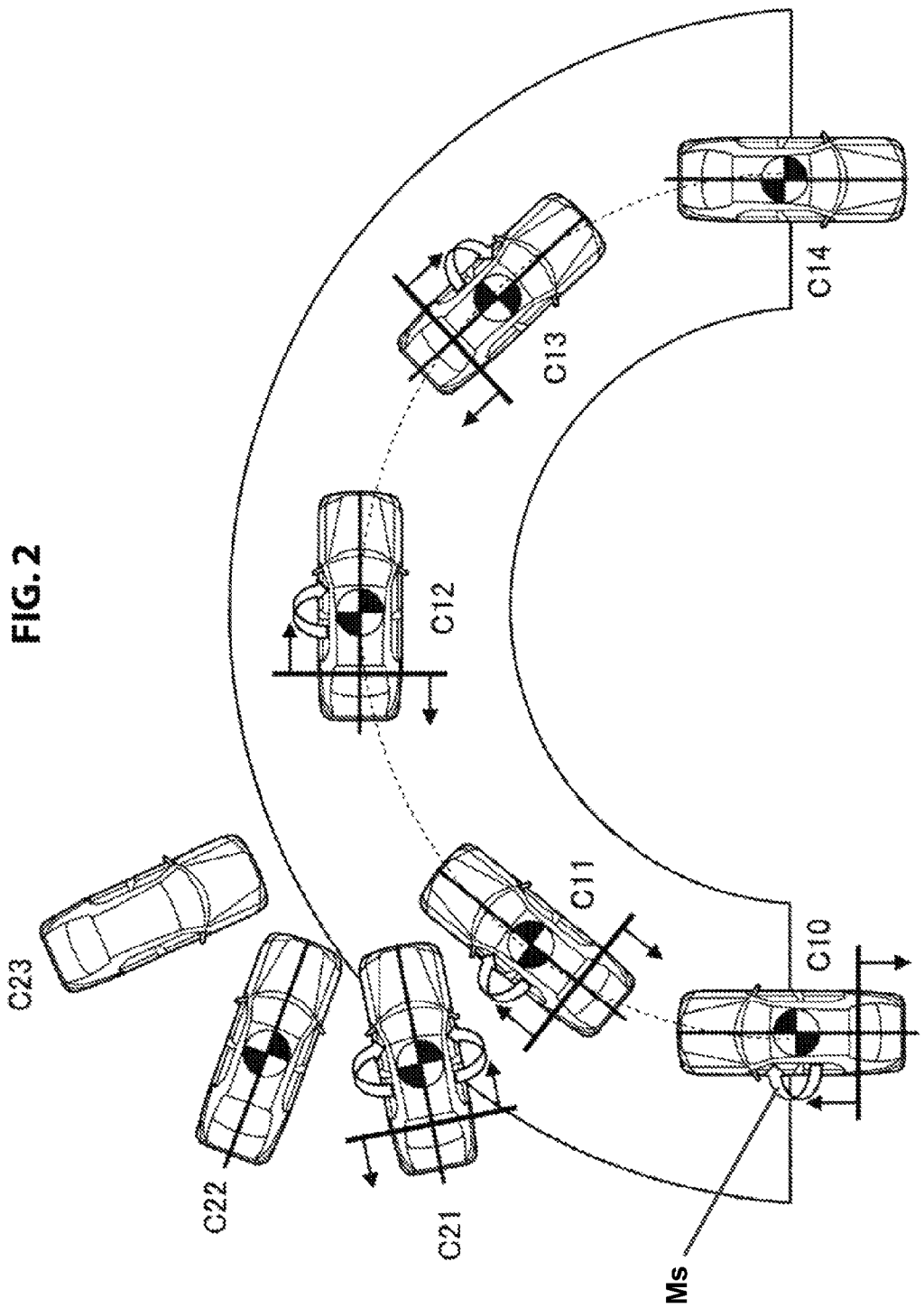
FIG. 2 is a diagram for explaining the behavior of a vehicle when known turn assist control is performed with respect to rear wheels.

Here, the turn assist control improves turning performance of the vehicle when the vehicle is traveling on a high μ road surface. The behavior of the vehicle when the turn assist control is performed will now be described in detail below with reference to FIG. 2. FIG. 2 is a diagram for explaining the behavior of the vehicle when known turn assist control is performed with respect to the rear wheels. Hereinafter, unless otherwise noted, the turn assist control is assumed to be turn assist control with respect to the rear wheels. In FIG. 2, C11, C12, and C13 represent the behavior of a known vehicle traveling on a high μ road surface.

Figure 3:
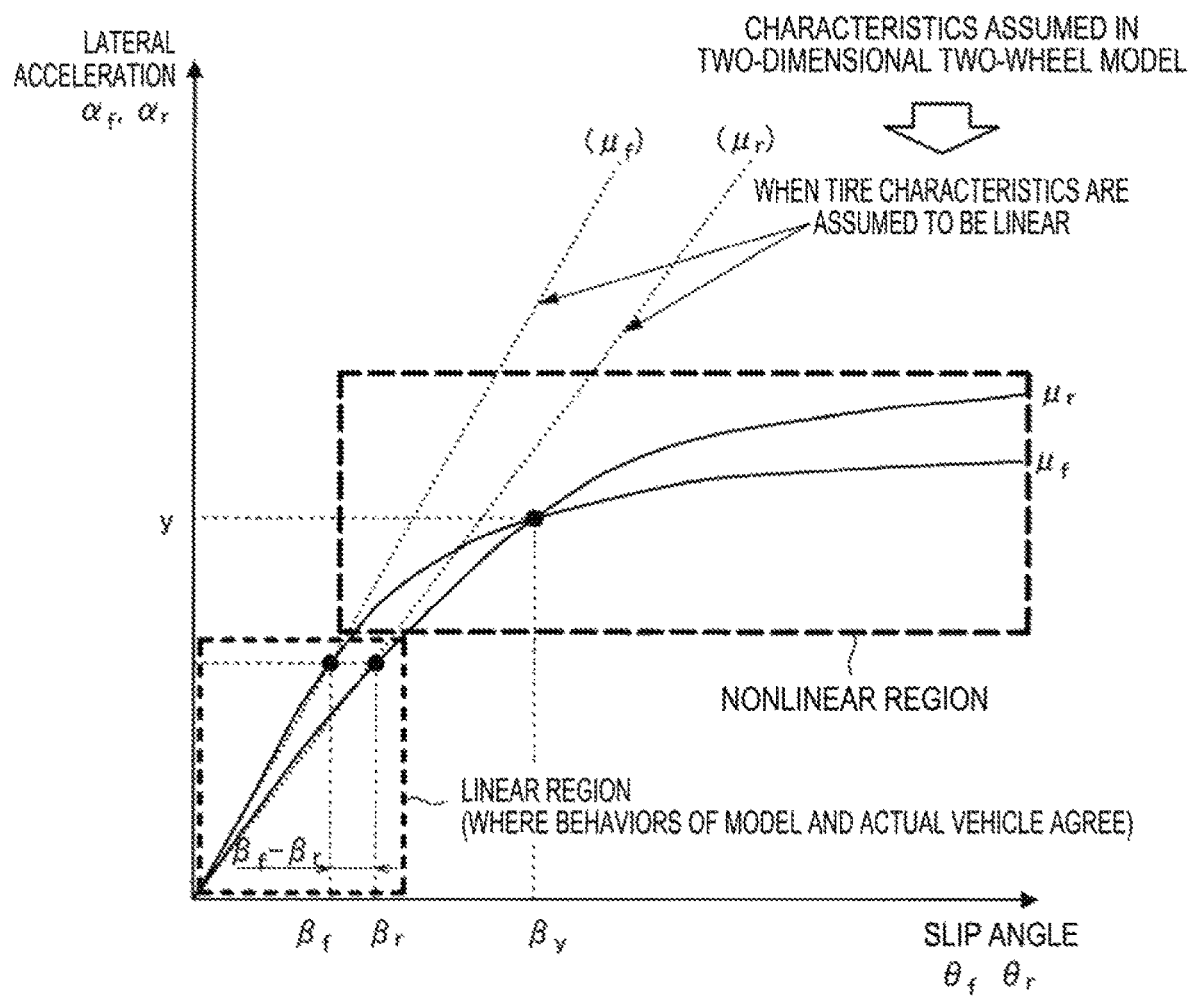
FIG. 3 is a diagram illustrating the relationship between lateral accelerations and slip angles of wheels.

First, when the vehicle enters a corner, a yaw moment Ms is generated based on a steering operation by the driver, and the vehicle starts making a turn (C10). At this time, the turn assist control causes driving forces to be transferred to the rear wheels, so that a yaw moment that acts in the same direction as that of the yaw moment Ms based on the steering operation is additionally generated. As a result, the vehicle makes a turn at the corner along the road with understeer being avoided (C11, C12, and C13), and completes the turn (C14). Further, with reference to FIG. 3, the action of the turn assist control will now be described in detail below. FIG. 3 is a diagram illustrating the relationship between lateral accelerations and slip angles of the wheels (hereinafter referred to also as the tires).

As illustrated in FIG. 3, characteristics (hereinafter referred to also as cornering characteristics) that indicate the relationship between the lateral accelerations and slip angles of the tires have a linear region in which the lateral acceleration varies linearly with the slip angle (i.e., a region where the speed at which the steering wheel is turned is relatively low). In the linear region, the lateral acceleration increases with increasing slip angle. In a two-dimensional two-wheel model, for example, the cornering characteristics of the tires are supposed to be linear, and the behaviors of the model and an actual vehicle substantially agree in the above linear region.

Meanwhile, as the slip angles increase to be relatively large, the cornering characteristics of the tires become nonlinear unlike in the two-dimensional two-wheel model. That is, there is a nonlinear region in which the lateral acceleration varies nonlinearly with the slip angle, and in this nonlinear region, the rate of increase in lateral acceleration is decreased with respect to the rate of increase in slip angle.

As described above, when the slip angle increases to be relatively large, the rate of increase in lateral acceleration obtained is decreased, and a reduction in the upper-limit value of the lateral acceleration may easily cause a saturation of a tire traction circle. If the lateral acceleration of the front wheels reaches a saturation point, understeer occurs. Accordingly, the turn assist control is applied to the rear wheels of the vehicle to generate, independently of the generation of the yaw moment by the steering of the front wheels, an additional yaw moment acting in the same direction as that of the yaw moment generated by the steering of the front wheels, to produce an additional lateral acceleration to avoid a saturation of the lateral acceleration. As a result, understeer is avoided, and the vehicle can make a successful turn.

However, known turn assist control may sometimes reduce stability of the behavior of the vehicle traveling on a low μ road surface. This will now be described in detail below with reference to FIG. 2. In FIG. 2, C21, C22, and C23 represent the behavior of the known vehicle traveling on a low μ road surface.

First, the vehicle starts making a turn just as when the vehicle is traveling on the high μ road surface (C10). At this time, if the turn assist control is performed, the longitudinal forces of the rear wheels are increased, resulting in reductions in the maximum permissible amounts of the lateral forces, as in the case of the high μ road surface. Further, when the vehicle is traveling on the low μ road surface, traction circle characteristics of the tires, which will be described below, are reduced to a greater degree than when the vehicle is traveling on the high μ road surface, and the maximum permissible amounts of the lateral forces are accordingly further reduced. Therefore, when the vehicle is traveling on the low μ road surface, the lateral forces of the rear wheels tend to more easily reach a saturation point, that is, oversteer tends to more easily occur (C21). This leads to an easier occurrence of a spin of the vehicle (C22 and C23). Hereinafter, the vehicle having a tendency to easily spin will be sometimes described as the vehicle having a "spin tendency". Note that, even if the turn assist control is performed to generate a yaw moment acting in the opposite direction when the vehicle is in the state indicated by C21, an inertial force is greater than the generated yaw moment, making it difficult to stabilize the behavior of the vehicle. Further, with reference to FIG. 4, a case where the vehicle has the spin tendency will now be described in detail below.

Figure 4:
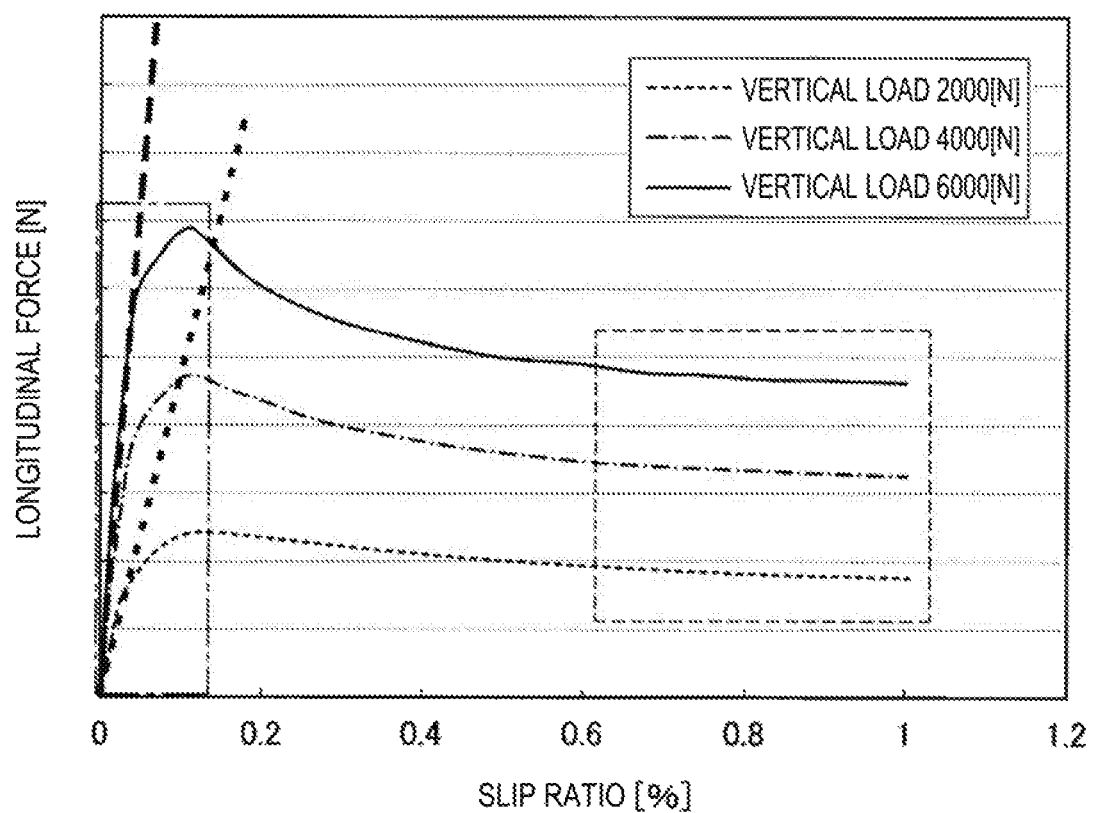
FIG. 4 is a diagram illustrating the relationship between longitudinal forces and slip ratios of tires.

FIG. 4 is a diagram illustrating the relationships between longitudinal forces and slip ratios of the tires.

As illustrated in FIG. 4, in characteristics (hereinafter referred to also as longitudinal force characteristics of the tires) indicating the relationships between the longitudinal forces and the slip ratios of the tires, the longitudinal force increases with increasing slip ratio before the slip ratio increases to a certain value. The longitudinal force reaches a saturation point when, for example, the longitudinal force has been increased to an upper limit of a traction circle characteristic of the tire. If an attempt to further increase the longitudinal force is made in this situation, the tire will slip. The degree of this slip of the tire is expressed as the slip ratio. The slip ratio is calculated from Eq. (1) below.

$$\text{Slip ratio} = (\text{Vehicle speed} - \text{Wheel speed})/\text{Vehicle speed} \tag{1}$$

However, once the slip ratio increases to reach a certain value, the longitudinal force begins to decrease. This is because the increase in the slip ratio reduces the traction circle characteristic of the tire, resulting in a reduction in maximum permissible amount of the longitudinal force. If a gain for the turn assist control is increased in this condition, the longitudinal force characteristic of the tire varies so as to approach a region enclosed by a broken line in FIG. 4, that is, the slip ratio increases and the longitudinal force decreases. Conversely, if the gain for the turn assist control is decreased, the longitudinal force characteristic of the tire varies so as to approach a region enclosed by a dot-dashed line in FIG. 4, that is, the slip ratio decreases and the longitudinal force increases.

Figure 5:
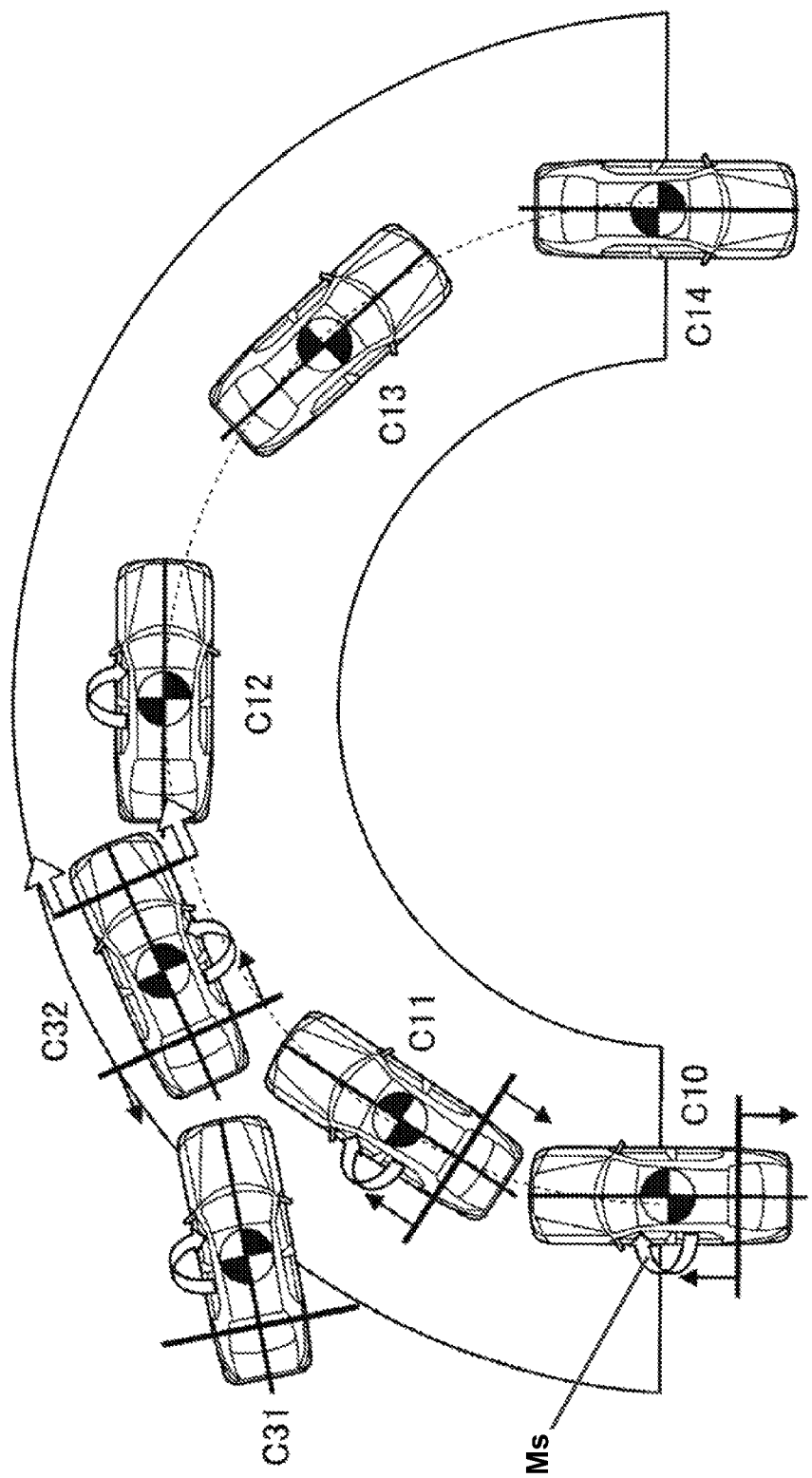
FIG. 5 is a diagram for explaining the behavior of the vehicle when turn control of the vehicle according to an implementation of the present invention is performed.

Here, on a low μ road surface, which causes the tires to have reduced traction circle characteristics compared to those on a high μ road surface, the maximum permissible amounts of both the longitudinal force and the lateral force are reduced. If the gain for the turn assist control is increased in this condition, the slip ratio increases, and the traction circle characteristics of the rear tires are further reduced. This further reduces the maximum permissible amount of the lateral force without a sufficient longitudinal force being obtained, making it more likely for the lateral force to reach a saturation point. This may lead to an easy occurrence of oversteer, and may ultimately cause the vehicle to spin Accordingly, in one implementation of the present invention, when the vehicle 100 is determined to have the spin tendency, the control apparatus 200 decides a rotation difference control amount to perform rotation difference control (hereinafter referred to also as left-right rotation difference control or front tire rotation rate regulation control) to reduce a difference in rotation between the left and right front wheels 102 and 104. Hereinafter, unless otherwise noted, the left-right rotation difference control is assumed to be left-right rotation difference control on the front wheels. With reference to FIG. 5, an outline of turn control of the vehicle according to one implementation of the present invention will now be described below. FIG. 5 is a diagram for explaining the behavior of the vehicle when the turn control of the vehicle according to one implementation of the present invention is performed. In FIG. 5, C31 to C34 represent the behavior of the vehicle 100 according to the present implementation when the vehicle 100 is traveling on a low μ road surface.

First, the vehicle 100 starts making a turn, just as in the case of the known vehicle (C10). At this time, the turn assist control is performed as in the case of the high μ road surface, and therefore, the longitudinal forces of the rear wheels 106 and 108 are increased, resulting in reductions in the maximum permissible amounts of the lateral forces thereof. Further, when the vehicle 100 is traveling on the low μ road surface, the traction circle characteristics of the tires are reduced, and the maximum permissible amounts of the lateral forces are accordingly further reduced. Accordingly, oversteer occurs as described above, and the vehicle 100 comes to have the spin tendency (C31).

Accordingly, the vehicle 100 first reduces a gain for the turn assist control. For example, the vehicle 100 reduces the gain for the turn assist control to zero (C31). This reduces the longitudinal forces of the rear wheels 106 and 108, resulting in increases in the maximum permissible amounts of the lateral forces thereof. As a result, the lateral forces of the rear wheels 106 and 108 become less likely to reach a saturation point, making a spin of the vehicle 100 less likely to occur. However, the yaw rate may not converge, resulting in unstable behavior of the vehicle 100.

Accordingly, the vehicle 100 reduces the difference in rotation between the left and right front wheels 102 and 104 while reducing the gain for the turn assist control. For example, the vehicle 100 brings the left and right front wheels 102 and 104 into synchronization in rotation rate, and thereby generates a yaw moment acting in a direction opposite to the direction of a yaw moment of inertia (C32). As a result, the behavior of the vehicle 100 is stabilized (C12), allowing the vehicle 100 to make a turn at the corner along the road (C13). Further, with reference to FIG. 6, the stabilization of the vehicle 100 will now be described in detail below. FIG. 6 illustrates the relationship between the longitudinal and lateral forces of the rear wheel.

Regarding characteristics (hereinafter referred to also as the traction circle characteristics of the tire) that indicate the relationship between the longitudinal and lateral forces of each of the rear wheels 106 and 108, at a start (C10 in FIG. 5) of a turn that involves the turn assist control, for example, the longitudinal force generated is as great as is indicated by an arrow that points along the longitudinal axis in the left diagram in FIG. 6, and the length of an arrow that points along the lateral axis corresponds to the maximum permissible amount of the lateral force. If the lateral force exceeds the maximum permissible amount of the lateral force, oversteer will occur, and the vehicle will come to have the spin tendency.

In contrast, when the vehicle 100 is in a state indicated by C32 in FIG. 5, for example, the gain for the turn assist control has been reduced, resulting in a reduction in the longitudinal force and an increase in the maximum permissible amount of the lateral force as illustrated in dotted line arrows in the right diagram in FIG. 6 when compared to the start (C10) of the turn. Further, the left-right rotation difference control generates the yaw moment acting in the direction opposite to the direction of the yaw moment of inertia, but the increase in the maximum permissible amount of the lateral force prevents the lateral force from reaching a saturation point, allowing a lateral force to be obtained by the generated yaw moment. This makes the yaw rate more easily converge, to prevent an occurrence of oversteer and stabilize the behavior of the vehicle 100.

2. DETAILS OF CONTROL APPARATUS ACCORDING TO ONE IMPLEMENTATION OF PRESENT INVENTION

The outline of the control apparatus 200 of the vehicle according to one implementation of the present invention has been described above. Next, details of the control apparatus 200 will now be described below.

2-1. Structure of Apparatus

Figure 7:
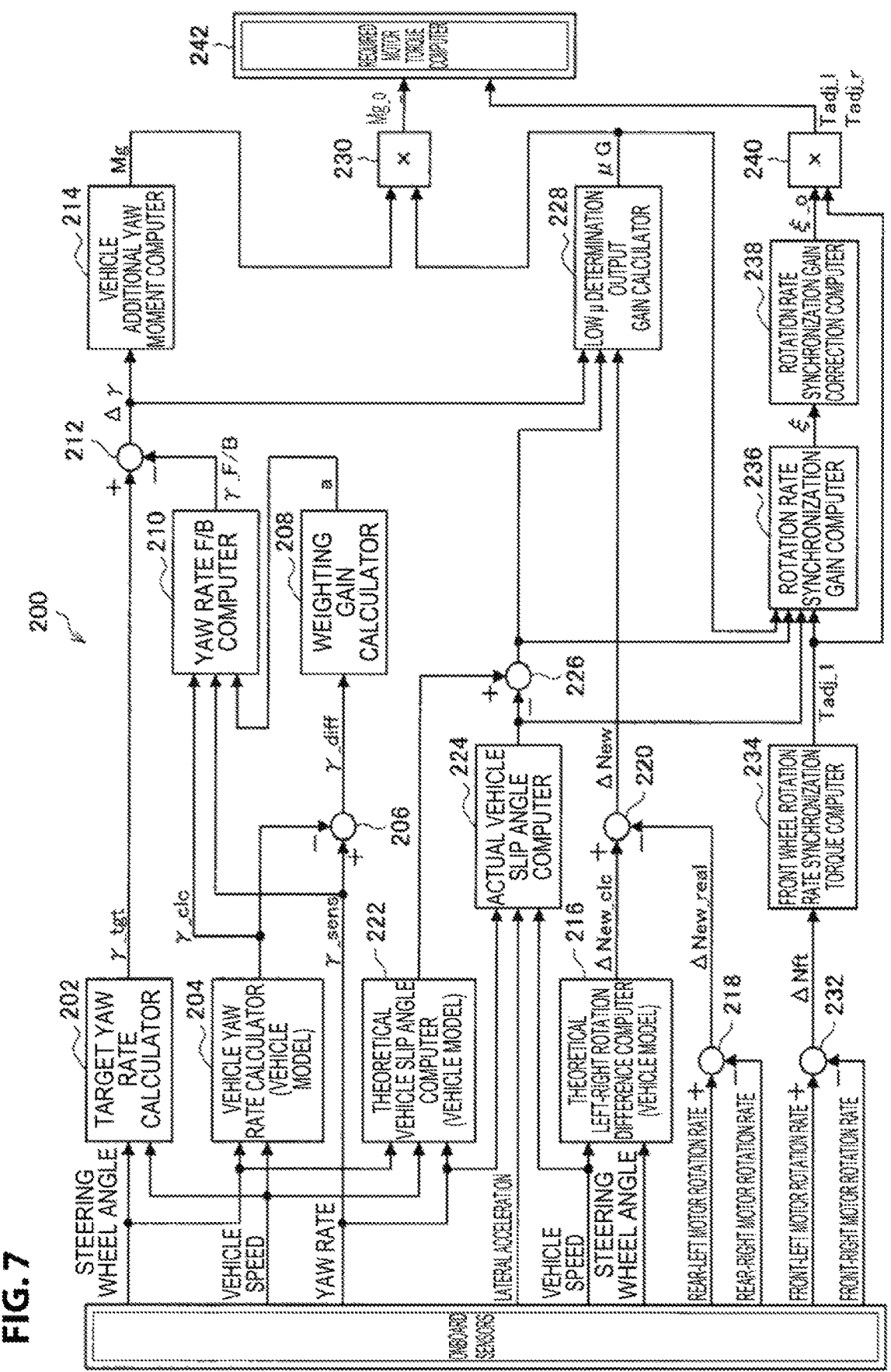
FIG. 7 is a block diagram schematically illustrating the functional configuration of a control apparatus of the vehicle according to an implementation of the present invention and the configuration of surrounding components of the control apparatus.

First, with reference to FIG. 7, the functional configuration of the control apparatus 200 of the vehicle according to the present implementation will now be described below. FIG. 7 is a block diagram schematically illustrating the functional configuration of the control apparatus 200 of the vehicle according to the present implementation and the configuration of surrounding components of the control apparatus 200.

Referring to FIG. 7, the control apparatus 200 includes a target yaw rate calculator 202, a vehicle yaw rate calculator 204, subtractors 206, 212, 218, 220, 226, and 232, a weighting gain calculator 208, a yaw rate F/B computer 210, a vehicle additional yaw moment computer 214, a theoretical left-right rotation difference computer 216, a theoretical vehicle slip angle computer 222, an actual vehicle slip angle computer 224, a low μ determination output gain calculator 228, multipliers 230 and 240, a front wheel rotation rate synchronization torque computer 234, a rotation rate synchronization gain computer 236, a rotation rate synchronization gain correction computer 238, a required motor torque computer 242, and an inverter controller (not illustrated).

In addition, the control apparatus 200 is coupled to onboard sensors mentioned above, and acquires information from the onboard sensors as illustrated in FIG. 7.

(Onboard Sensors)

The onboard sensors include the steering wheel angle sensor 140, the wheel speed sensors 142 and 144, the lateral acceleration sensor 148, the yaw rate sensor 150, and the motor rotation rate sensors, all of which have been mentioned above.

The steering wheel angle sensor 140 measures a steering wheel angle θ inputted by an operation of the steering wheel 134 by the driver. The wheel speed sensors 142 and 144 measure the vehicle speed V of the vehicle 100. The lateral acceleration sensor 148 measures a lateral acceleration Ay of the vehicle 100. The yaw rate sensor 150 measures an actual yaw rate γ (γ_sens) of the vehicle 100. In one implementation, the yaw rate sensor 150 may serve as a part of a "yaw rate acquirer". The motor rotation rate sensors measure the rotation rates of the respective motors 110 to 116. In one implementation, the motor rotation rate sensors may each serve as a "wheel rotation rate sensor".

(Turn Assist Control)

The target yaw rate calculator 204 calculates a target yaw rate γ_tgt based on the steering wheel angle θ and the vehicle speed V. More specifically, the target yaw rate calculator 204 calculates the target yaw rate γ_tgt using Eq. (2) below, which represents a common two-dimensional two-wheel model. The target yaw rate γ_tgt is calculated by substituting values calculated from Eqs. (3) and (4) below into the right side of Eq. (2). The calculated target yaw rate γ_tgt is inputted to the subtractor 210.

$$\gamma\_tgt = \frac{1}{1+TS} \times G_\delta^\gamma(0)_{tgt} \times \frac{\theta}{N} \quad (2)$$

$$G_\delta^\gamma(0)_{tgt} = \frac{1}{1+A_{tgt}V^2} \times \frac{V}{l} \quad (3)$$

-continued $$A_{tgt} = \frac{m}{2l} \times \frac{l_f \times K_{ftgt} + l_r \times K_{rtgt}}{K_{ftgt} \times K_{rtgt}} \quad (4)$$

Note that the variables, the constants, and the operator in Eqs. (2) to (4) are as follows.

That is, γ_tgt is the target yaw rate, θ is the steering wheel angle, V is the vehicle speed, T is a time constant of the vehicle, S is a Laplace operator, N is a steering gear ratio, I is a vehicle wheelbase, If is the distance from the center of gravity of the vehicle to a front wheel center, Ir is the distance from the center of gravity of the vehicle to a rear wheel center, m is the weight of the vehicle, Kftgt is target cornering power (the front wheels), and Krtgt is target cornering power (the rear wheels).

The vehicle yaw rate calculator 204 calculates a yaw rate model value γ_clc based on the steering wheel angle θ and the vehicle speed V. In one implementation, the vehicle yaw rate calculator 204 may serve as a part of the "yaw rate acquirer". More specifically, the vehicle yaw rate calculator 204 calculates the yaw rate model value γ_clc based on Eqs. (5), (6), (7), and (8) below, which are used to calculate a vehicle yaw rate. The yaw rate model value γ_clc is calculated by substituting values calculated from Eqs. (6) to (8) into the right side of Eq. (5). The calculated yaw rate model value γ_clc is inputted to the subtractor 206 and the yaw rate F/B computer 212.

$$\gamma\_clc = \gamma(s) \quad (5)$$

$$\gamma(s) = G_\delta^\gamma(0) \times \frac{1 + T_y s}{1 + \frac{2\zeta s}{\omega_n} + \frac{s^2}{\omega_n^2}} \cdot \frac{\theta(s)}{n} \quad (6)$$

$$G_\delta^\gamma(0) = \frac{1}{1 + AV^2} \times \frac{V}{l} \quad (7)$$

$$T_y = \frac{m l_f V}{2 K_r l} \quad (8)$$

Note that the variable, the constants, and the operator in Eqs. (5) to (8) are as follows.
γ_clc: the yaw rate model value
s: a Laplace operator
ζ: a damping ratio in vehicle response
n: a steering gear ratio
ωn: a natural frequency in vehicle response The subtractor 206 calculates a difference γ_diff between the actual yaw rate γ_sens and the yaw rate model value γ_clc. More specifically, the actual yaw rate γ_sens of the vehicle 100, which is measured by the yaw rate sensor 150, is inputted to the subtractor 206. The subtractor 206 subtracts the yaw rate model value γ_clc from the actual yaw rate γ_sens to calculate the difference γ_diff between the actual yaw rate γ_sens and the yaw rate model value γ_clc. The difference γ_diff is inputted to the weighting gain calculator 208.

Figure 8:
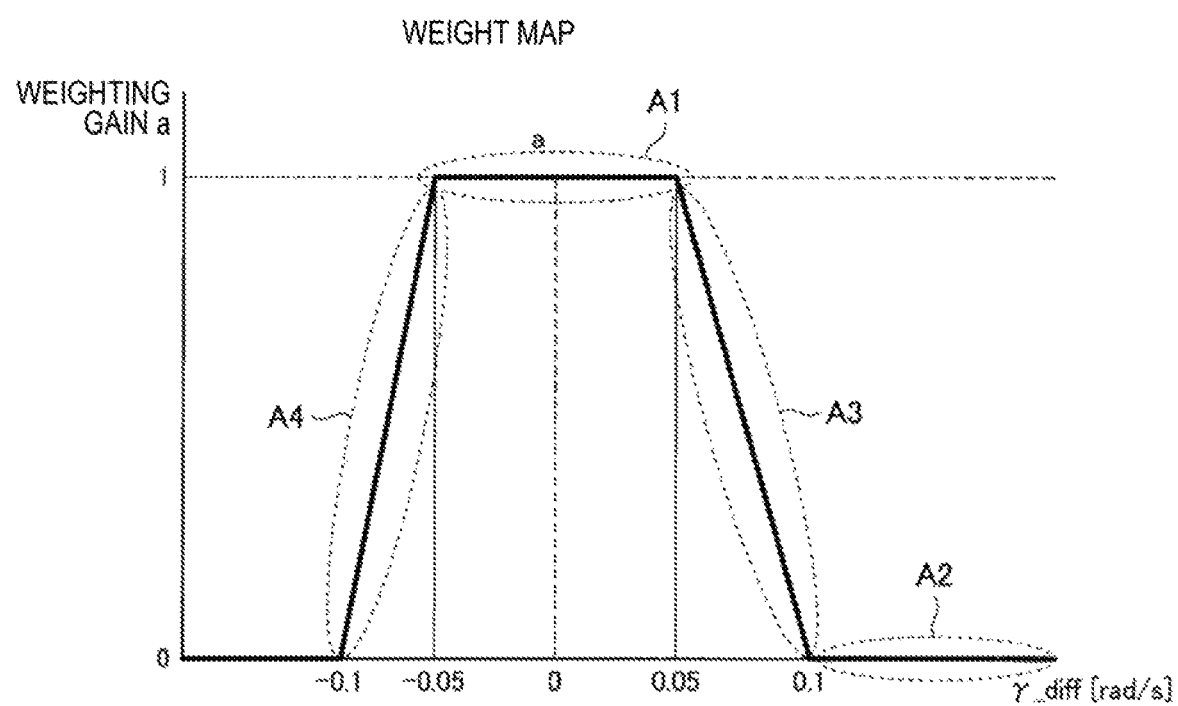
FIG. 8 is a schematic diagram illustrating a gain map used by a weighting gain calculator to calculate a weighting gain.

The weighting gain calculator 208 calculates a weighting gain a based on the difference γ_diff inputted from the subtractor 206. The weighting gain a is used to reduce yaw rate noise. With reference to FIG. 8, a process of calculating the weighting gain a will now be described in detail below. FIG. 8 is a schematic diagram illustrating a gain map used by the weighting gain calculator 208 to calculate the weighting gain a.

As illustrated in FIG. 7, the value of the weighting gain a varies between 0 and 1 in accordance with the reliability of the vehicle model. The difference (or deviation) γ_diff between the yaw rate model value γ_clc and the actual yaw rate γ_sens is used as an indicator of the reliability of the vehicle model. As illustrated in FIG. 8, the gain map is set such that the value of the weighting gain a will be greater for smaller absolute values of the difference γ_diff. The weighting gain calculator 208 subjects the difference γ_diff to a mapping process of FIG. 8 to compute the weighting gain a in accordance with the reliability of the vehicle model.

As illustrated in FIG. 8, the weighting gain a takes a value between 0 and 1 (i.e., 0<=a<=1).

When −0.05 [rad/s]<=γ_diff<=0.05 [rad/s], the weighting gain a is determined to be 1 (i.e., a=1).

In addition, when 0.1<γ_diff or γ_diff<−0.1, the weighting gain a is determined to be 0 (i.e., a=0).

In addition, when 0.05 [rad/s]<γ_diff<=0.1 [rad/s], the weighting gain a is calculated based on Eq. (9) below.

$$a = -20 * \gamma\_diff + 2 \quad (9)$$

In addition, when −0.1 [rad/s]<=γ_diff<−0.05 [rad/s], the weighting gain a is calculated based on Eq. (10) below.

$$a = 20 * \gamma\_diff + 2 \quad (10)$$

A region A1 in the gain map illustrated in FIG. 8, which is a region where the difference γ_diff approaches 0, is a region where the S/N ratio of the actual yaw rate γ_sens is low, or a region where tire cornering characteristics exhibit linearity (e.g., when the road surface is dry). Therefore, in the region A1, the yaw rate model value γ_clc calculated by the vehicle yaw rate calculator 204 has a high degree of reliability. Accordingly, in the region A1, the value of the weighting gain a is determined to be 1, and a feedback yaw rate γ_F/B is computed using Eq. (11) below with a 100% distribution of the yaw rate model value γ_clc.

Further, a region A2 in the gain map illustrated in FIG. 8 is a region where the difference γ_diff has a large value, and is a marginal region in which the tires are sliding. In this region A2, the yaw rate model value γ_clc calculated by the vehicle yaw rate calculator 204 has a low degree of reliability, and the difference γ_diff has a greater value. Accordingly, the value of the weighting gain a is determined to be 0, and the feedback yaw rate γ_F/B is computed using Eq. (11) below with a 100% distribution of the actual yaw rate γ_sens.

Furthermore, a region A3 in the gain map illustrated in FIG. 8 is a region (a nonlinear region) where the difference γ_diff transitions from a linear region to the marginal region, and in the region A3, the distributions of the yaw rate model value γ_clc and the actual yaw rate γ_sens (i.e., the value of the weighting gain a) are linearly varied. In the transition from the region A1 (i.e., a high μ region) to the region A2 (i.e., a low μ region), or the transition from the region A2 (i.e., the low μ region) to the region A1 (i.e., the high μ region), the weighting gain a is computed using linear interpolation to avoid a torque change and a yaw rate change caused by an abrupt change in the weighting gain a.

Furthermore, a region A4 in the gain map illustrated in FIG. 8 is, in contrast to the region A3, a region where the actual yaw rate γ_sens is greater than the yaw rate model value γ_clc. In the case where an incorrect parameter is inputted to the vehicle yaw rate calculator 204, and the yaw rate model value γ_clc is accordingly calculated, for example, the actual yaw rate γ_sens can be used based on a map of the region A4 to perform control.

Note that, although the example case where the weighting gain a varies within the range of 0 to 1 has been described above, the range of the weighting gain a is not limited to the range of 0 to 1, and that any range of the weighting gain a that allows vehicle control may be adopted in other implementations of the present invention without departing from the scope of the present invention.

The yaw rate F/B computer 210 calculates the feedback yaw rate γ_F/B based on the yaw rate model value γ_clc, the actual yaw rate γ_sens, and the weighting gain a. More specifically, the yaw rate F/B computer 210 weights both the yaw rate model value γ_clc and the actual yaw rate γ_sens using the weighting gain a, and calculates the feedback yaw rate γ_F/B based on Eq. (11) below. The calculated feedback yaw rate γ_F/B is inputted to the subtractor 212.

$$\gamma\_F/B = a * \gamma\_clc + (1-a) * \gamma\_sens \qquad (11)$$

The subtractor 212 calculates a difference between the target yaw rate γ_tgt and the feedback yaw rate γ_F/B. More specifically, the subtractor 212 subtracts the feedback yaw rate γ_F/B from the target yaw rate γ_tgt inputted from the target yaw rate calculator 202 to calculate a difference Δγ between the target yaw rate γ_tgt and the feedback yaw rate γ_F/B. That is, the difference Δγ is calculated based on Eq. (12) below. The calculated difference Δγ is, as a yaw rate control value, inputted to the vehicle additional yaw moment computer 214. In addition, the difference Δγ is inputted to the low μ determination output gain calculator 228.

$$\Delta\gamma = \gamma\_Tgt - \gamma\_F/B \qquad (12)$$

The vehicle additional yaw moment computer 214 calculates a vehicle additional yaw moment based on the yaw rate of the vehicle 100. In one implementation, the vehicle additional yaw moment computer 214 may serve as an "additional yaw moment decider", and the vehicle additional yaw moment may serve as an "additional yaw moment". More specifically, the vehicle additional yaw moment computer 214 computes a vehicle additional yaw moment Mg based on the inputted difference Δγ so that the difference Δγ will become 0, that is, so that the target yaw rate γ_tgt will agree with the feedback yaw rate γ_F/B. More specifically, the vehicle additional yaw moment Mg is calculated from Eq. (13) below. The vehicle additional yaw moment Mg thus calculated is an additional yaw moment that is applied to a center of the vehicle 100 to provide assistance in a turn of the vehicle 100.

$$Mg = \frac{d}{dt}[\Delta\gamma \times G_\gamma] \times Iz + (\Delta\gamma \times G_\gamma) \times \{2(l_f^2 K_f + l_r^2 K_r)/V\} \qquad (13)$$

Meanwhile, the theoretical left-right rotation difference computer 216 calculates a theoretical rear left-right rotation difference value ΔNew_clc based on the vehicle speed V and the steering wheel angle θ. More specifically, the theoretical rear left-right rotation difference value ΔNew_clc represents a difference between the rotation rates of the left and right rear wheels 106 and 108, and this difference can be geometrically determined in accordance with the turning radii of the wheels. In one implementation, the theoretical left-right rotation difference computer 216 may serve as a part of a "rotation difference acquirer", and the theoretical rear left-right rotation difference value ΔNew_clc may serve as a "first rotation difference". The calculated theoretical rear left-right rotation difference value ΔNew_clc is inputted to the subtractor 220.

The subtractor 218 calculates an actual rear left-right rotation difference value ΔNew_real based on the motor rotation rates for the left and right rear wheels 106 and 108. More specifically, the subtractor 220 calculates the actual rear left-right rotation difference value ΔNew_real, which represents a difference between the rotation rate of the left rear wheel 106 and the rotation rate of the right rear wheel 108 determined based on the rotation rates of the motors obtained from the motor rotation rate sensors. In one implementation, the subtractor 218 may serve as a part of the "rotation difference acquirer", and the actual rear left-right rotation difference value ΔNew_real may serve as a "second rotation difference". Note that the actual rear left-right rotation difference value ΔNew_real may be calculated from a difference between the rotation rates measured by the left and right wheel speed sensors 142 and 144. The calculated actual rear left-right rotation difference value ΔNew_real is inputted to the subtractor 220.

The subtractor 220 calculates a difference ΔNew between the theoretical rear left-right rotation difference value ΔNew_clc and the actual rear left-right rotation difference value ΔNew_real. More specifically, the subtractor 220 subtracts the actual rear left-right rotation difference value ΔNew_real from the theoretical rear left-right rotation difference value ΔNew_clc to calculate the difference ΔNew. That is, the difference ΔNew is calculated based on Eq. (14) below. The calculated difference ΔNew is inputted to the low μ determination output gain calculator 228.

$$\Delta New = \Delta New\_clc - \Delta New\_real \qquad (14)$$

Meanwhile, the theoretical vehicle slip angle computer 222 calculates a theoretical vehicle slip angle value β_clc based on the steering wheel angle θ, the vehicle speed V, and the actual yaw rate γ_sens. For example, the theoretical vehicle slip angle value β_clc is calculated using an equation of motion for a common vehicle. In one implementation, the theoretical vehicle slip angle computer 222 may serve as a part of a "vehicle slip angle acquirer". The calculated theoretical vehicle slip angle value β_clc is inputted to the subtractor 226.

The actual vehicle slip angle computer 224 calculates an actual vehicle slip angle value β_real based on the actual yaw rate γ_sens, the lateral acceleration Ay, and the vehicle speed V. More specifically, the actual vehicle slip angle computer 224 calculates the actual vehicle slip angle value β_real based on Eq. (15) below. In one implementation, the actual vehicle slip angle computer 224 may serve as a part of the "vehicle slip angle acquirer". The calculated actual vehicle slip angle value β_real is inputted to the subtractor 226 and the rotation rate synchronization gain computer 236.

$$\beta\_real = d(Ay/V - \gamma\_sens)/dt \qquad (15)$$

The subtractor 226 calculates a difference Δβ between the theoretical vehicle slip angle value β_clc and the actual vehicle slip angle value β_real. More specifically, the subtractor 226 subtracts the actual vehicle slip angle value β_real from the theoretical vehicle slip angle value β_clc to calculate the difference Δβ. That is, the difference Δβ is calculated based on Eq. (16) below. The calculated difference Δβ is inputted to the low μ determination output gain calculator 228 and the rotation rate synchronization gain computer 236.

$$\Delta\beta = \beta\_clc - \beta\_real \qquad (16)$$

The low μ determination output gain calculator 228 makes a determination as to a spin tendency determination flag μjud for the vehicle 100 and calculates a low μ determination output gain μG based on the differences ΔNew and Δγ. In one implementation, the low μ determination output gain calculator 228 may serve as a "spin tendency determiner" and an "additional yaw moment adjuster". More specifically, the low μ determination output gain calculator 228 compares the difference ΔNew with a corresponding threshold value and the difference Δγ with a corresponding threshold value to make a determination as to the spin tendency determination flag μjud for the vehicle 100. Details thereof will be described below with reference to a flowchart illustrated in FIG. 15.

In addition, the low μ determination output gain calculator 228 calculates the low μ determination output gain μG based on the differences ΔNew and Δγ and the spin tendency determination flag μjud. More specifically, the low μ determination output gain calculator 228 decides the low μ determination output gain μG such that the vehicle additional yaw moment will be reduced when the vehicle 100 is determined to have the spin tendency (i.e., when μjud=1).

Figure 9:
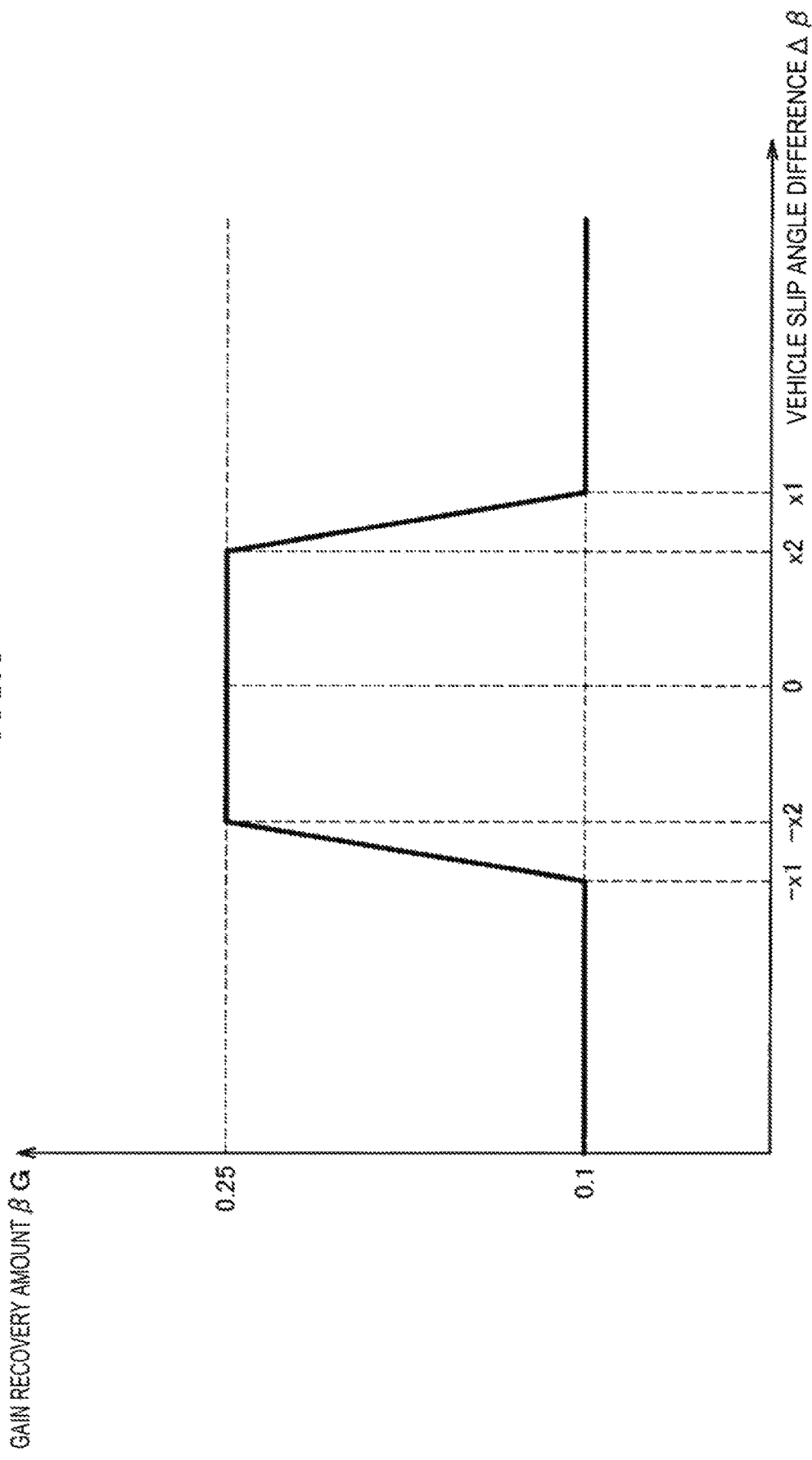
FIG. 9 is a schematic diagram illustrating a gain map for a gain recovery amount, which is used to calculate a low μ determination output gain.

Further, the low μ determination output gain calculator 228 varies the low μ determination output gain μG such that the vehicle additional yaw moment once reduced will be increased over time when the vehicle 100 has come to be without the spin tendency. More specifically, when the vehicle 100 has come to be without the spin tendency, the low μ determination output gain calculator 228 varies the low μ determination output gain μG based on the difference Δβ in each subsequent iteration of deciding the low μ determination output gain. For example, the low μ determination output gain calculator 228 increases the low μ determination output gain μG over time by adding a gain recovery amount βG determined based on the difference Δβ to the low μ determination output gain μG. Further, with reference to FIG. 9, a process of recovering the low μ determination output gain μG will now be described in detail below. FIG. 9 is a schematic diagram illustrating a gain map for the gain recovery amount βG, which is used to calculate the low μ determination output gain μG.

As illustrated in FIG. 9, the value of the gain recovery amount βG varies between, for example, 0.1 and 0.25 in accordance with the difference Δβ with respect to the vehicle slip angle. Referring to FIG. 9, the gain map is set such that, when the difference Δβ is between threshold values −x1 and −x2 or between threshold values x2 and x1, the value of the gain recovery amount βG increases as the absolute value of the difference Δβ decreases. In addition, when the difference Δβ is equal to or smaller than the threshold value −x1 or equal to or greater than the threshold value x1, the gain recovery amount βG is fixed at a lower-limit value, i.e., 0.1. In addition, when the difference Δβ is between the threshold values −x2 and x2, the gain recovery amount βG is fixed at an upper-limit value, i.e., 0.25. The low μ determination output gain calculator 228 calculates the low μ determination output gain βG such that the low μ determination output gain μG is increased over time, by adding the gain recovery amount βG decided in accordance with the gain map as described above to a last value μG' of the low μ determination output gain μG. That is, the low μ determination output gain μG is calculated based on Eq. (17) below.

$$\mu G = \mu G' + \beta G \quad (17)$$

The multiplier 230 calculates a corrected vehicle additional yaw moment Mg_o based on the vehicle additional yaw moment Mg and the low μ determination output gain μG. More specifically, the multiplier 230 multiplies the vehicle additional yaw moment Mg by the low μ determination output gain μG to calculate the corrected vehicle additional yaw moment Mg_o. In one implementation, the multiplier 230 may serve as a part of the "additional yaw moment decider". That is, the corrected vehicle additional yaw moment Mg_o is calculated based on Eq. (18) below. The calculated corrected vehicle additional yaw moment Mg_o is inputted to the required motor torque computer 242.

$$Mg\_o = \mu G * Mg \quad (18)$$

(Left-Right Rotation Difference Control)

The subtractor 232 calculates an actual front left-right rotation difference value ΔNft based on the motor rotation rates for the left and right front wheels 102 and 104. More specifically, the subtractor 232 calculates the actual front left-right rotation difference value ΔNft, which represents a difference between a rotation rate Nft_l of the left front wheel 102 and a rotation rate Nft_r of the right front wheel 104 determined based on the rotation rates of the motors obtained from the motor rotation rate sensors. That is, the actual front left-right rotation difference value ΔNft is calculated based on Eq. (19) below. The calculated actual front left-right rotation difference value ΔNft is inputted to the front wheel rotation rate synchronization torque computer 234.

$$\Delta Nft = Nft\_l - Nft\_r \quad (19)$$

The front wheel rotation rate synchronization torque computer 234 calculates a front wheel rotation rate synchronization torque Tadj_1 based on the actual front left-right rotation difference value ΔNft. More specifically, the front wheel rotation rate synchronization torque Tadj_1 is calculated based on a yaw moment of inertia I of the wheels and the actual front left-right rotation difference value ΔNft. That is, the front wheel rotation rate synchronization torque Tadj_1 is calculated based on Eq. (20) below. The calculated front wheel rotation rate synchronization torque Tadj_1 is inputted to the rotation rate synchronization gain computer 236 and the multiplier 240.

$$Tadj\_1 * d(\Delta Nft)/dt \quad (20)$$

The rotation rate synchronization gain computer 236 calculates a rotation rate synchronization gain ξ, which is used to control the difference in rotation between the left and right front wheels 102 and 104, based on the spin tendency determination flag μjud and the actual vehicle slip angle value β_real. In one implementation, the rotation rate synchronization gain computer 236 may serve as a "rotation difference decider", and the rotation rate synchronization gain ξ may serve as a "rotation difference control amount". More specifically, the rotation rate synchronization gain computer 236 calculates the rotation rate synchronization gain ξ such that the difference in rotation between the left and right front wheels 102 and 104 will be reduced when the vehicle 100 is determined to have the spin tendency (i.e., when μjud=1). More specifically, the rotation rate synchronization gain computer 236 calculates the rotation rate synchronization gain ξ based on the actual vehicle slip angle value β_real and the difference Δβ with respect to the vehicle slip angle, when the spin tendency determination flag μjud indicates "1" (i.e., when μjud=1). The rotation rate synchronization gain ξ is calculated based on Table 1 below, for example.

TABLE 1

| Input | | | Output |
|---|---|---|---|
| μjud | β_real | Δβ | ξ |
| 0 | — | — | 0 |
| 1 | <4 | <3 | 0.5 |
| 1 | <4 | >=3 | 0.75 |
| 1 | >=5 | — | 1 |

For example, when the vehicle 100 is determined to be without the spin tendency (i.e., μjud=0), the rotation rate synchronization gain ξ is determined to be 0.

Meanwhile, when the vehicle 100 is determined to have the spin tendency (i.e., μjud=1), and the actual vehicle slip angle value β_real is smaller than 4 (i.e., β_real<4) and the difference Δβ is smaller than 3 (i.e., Δβ<=3), the rotation rate synchronization gain ξ is determined to be 0.5.

Meanwhile, when the vehicle 100 is determined to have the spin tendency (i.e., μjud=1), and the actual vehicle slip angle value β_real is smaller than 4 (i.e., β_real<4) and the difference Δβ is equal to or greater than 3 (i.e. Δβ>=3), the rotation rate synchronization gain ξ is determined to be 0.75.

Meanwhile, when the vehicle 100 is determined to have the spin tendency (i.e., μjud=1), and the actual vehicle slip angle value β_real is equal to or greater than 5 (i.e., β_real>=5), the rotation rate synchronization gain ξ is determined to be 1.

The calculated rotation rate synchronization gain ξ is inputted to the rotation rate synchronization gain correction computer 238.

As described above, the left-right rotation difference control is performed in accordance with the degree of the spin tendency estimated from the actual vehicle slip angle value β_real. Here, if the rotation rate synchronization gain ξ were decided based only on whether or not the vehicle 100 has the spin tendency, the left and right front wheels 102 and 104 would be brought into synchronization even when, for example, the spin tendency is relatively slight. This might lead to an excessive yaw moment generated for the yaw moment of inertia. Accordingly, the rotation rate synchronization gain ξ is decided in a more sophisticated manner in accordance with the actual vehicle slip angle value β_real to prevent an excessive or insufficient amount of the generated yaw moment.

Furthermore, as described above, the left-right rotation difference control is performed in accordance with the difference Δβ between the theoretical vehicle slip angle value β_clc and the actual vehicle slip angle value β_real. Here, an erroneous measurement by a sensor, noise, or the like may cause a discrepancy between the state of the vehicle 100 and the state of the vehicle model, that is, the difference Δβ. In this case, the rotation rate synchronization gain ξ may be decided to have a value that is not suited to the actual state of the vehicle 100, and this may in turn cause an excessive or insufficient amount of the yaw moment to be generated by the left-right rotation difference control. Accordingly, as the difference Δβ increases, the value of the rotation rate synchronization gain ξ is increased, for example, to make the state of the vehicle 100 closer to the state of the vehicle model, so that generation of an excessive or insufficient amount of the yaw moment can be prevented.

The rotation rate synchronization gain correction computer 238 performs control of correcting the rotation rate synchronization gain ξ based on a past value of the rotation rate synchronization gain ξ. In one implementation, the rotation rate synchronization gain correction computer 238 may serve as a "rotation difference control amount corrector". More specifically, the rotation rate synchronization gain correction computer 238 performs the correction control such that the rotation rate synchronization gain ξ is not corrected when the value of the rotation rate synchronization gain ξ is equal to or greater than a last value ξ_o' of the rotation rate synchronization gain. For example, the rotation rate synchronization gain correction computer 238 calculates a difference Δξ between the rotation rate synchronization gain ξ and the last value ξ_o' of the rotation rate synchronization gain, and determines whether the difference Δξ is equal to or greater than 0. Then, when it is determined that the difference Δξ is equal to or greater than 0, the rotation rate synchronization gain correction computer 238 calculates the rotation rate synchronization gain ξ as the corrected rotation rate synchronization gain ξ_o. The difference Δξ is calculated based on Eq. (21) below, for example.

$$\Delta\xi = \xi - \xi\_o' \qquad (21)$$

Meanwhile, when the rotation rate synchronization gain ξ is smaller than the last value ξ_o' of the rotation rate synchronization gain, the rotation rate synchronization gain correction computer 238 adds, to the rotation rate synchronization gain ξ, a control amount that is smaller than the difference between the rotation rate synchronization gain ξ and the last value ξ_o' of the rotation rate synchronization gain. For example, when it is determined that the difference Δξ is smaller than 0, the rotation rate synchronization gain correction computer 238 adds, to the rotation rate synchronization gain ξ, a value obtained by subtracting a constant, for example, 0.05, from the absolute value of the difference Δξ, to calculate the corrected rotation rate synchronization gain ξ_o. The corrected rotation rate synchronization gain ξ_o is calculated based on Eq. (22) below, for example.

$$\xi\_o = \xi + (|\Delta\xi| - 0.05) \qquad (22)$$

The calculated corrected rotation rate synchronization gain ξ_o is inputted to the multiplier 240.

The multiplier 240 calculates a command rotation rate synchronization torque Tadj, which is used to control braking/driving forces of the left and right front wheels 102 and 104 of the vehicle 100, based on the corrected rotation rate synchronization gain ξ_o. In one implementation, the multiplier 240 may serve as a part of a "front wheel braking/driving force decider", and the command rotation rate synchronization torque Tadj may serve as a "front wheel braking/driving force control amount". More specifically, the multiplier 240 multiplies the front wheel rotation rate synchronization torque Tadj_1 by the corrected rotation rate synchronization gain ξ_o to calculate the command rotation rate synchronization torque Tadj. That is, the command rotation rate synchronization torque Tadj is calculated based on Eq. (23) below.

$$Tadj = \xi\_o * Tadj\_1 \qquad (23)$$

Further, the multiplier 240 calculates a command left front wheel rotation rate synchronization torque Tadj_l and a command right front wheel rotation rate synchronization torque Tadj_r based on the command rotation rate synchronization torque Tadj and the actual front left-right rotation difference value ΔNft. More specifically, the multiplier 240 calculates the command left front wheel rotation rate synchronization torque Tadj_l and the command right front wheel rotation rate synchronization torque Tadj_r in manners described below in accordance with the sign (positive or negative) of ΔNft.

When $\Delta Nft > 0$, $Tadj\_l = 0$, and $Tadj\_r = Tadj$.

When $\Delta Nft < 0$, $Tadj\_l = Tadj$, and $Tadj\_r = 0$.

The calculated command left front wheel rotation rate synchronization torque Tadj_l and the calculated command right front wheel rotation rate synchronization torque Tadj_r are inputted to the required motor torque computer 242.

(Braking/Driving Force Control)

The required motor torque computer 242 calculates control amounts for braking/driving forces of the left and right rear wheels 106 and 108 and the left and right front wheels 102 and 104. More specifically, the required motor torque computer 242 calculates an additional torque Tvmot, which is used to control the braking/driving forces of the left and right rear wheels 106 and 108 of the vehicle 100, based on the corrected vehicle additional yaw moment Mg_o. In one implementation, the required motor torque computer 242 may serve as a part of a "rear wheel braking/driving force decider" and a part of the "front wheel braking/driving force decider", and the additional torque Tvmot may serve as a rear wheel braking/driving force control amount. The additional torque Tvmot is calculated based on Eqs. (24) and (25) below, for example.

$$Tvmot = \Delta Tv / 2 \quad (24)$$

$$\Delta Tv = \frac{Mg\_o}{TrdR/2} \times \text{Tire} \times \frac{1}{Gratio} \quad (25)$$

Note that the variable and the constants in Eq. (25) are as follows.

Mg_o: the corrected vehicle additional yaw moment

TrdR: the tread width of the left and right rear wheels 106 and 108

TireR: the tire radius of the left and right front wheels 102 and 104

Gratio: the gear ratio of the gearboxes 122 and 124 for the left and right rear wheels 106 and 108

In addition, the required motor torque computer 242 calculates a required motor torque reqTq based on a requested driving force (i.e., the degree of opening of an accelerator pedal) inputted by the driver. More specifically, the required motor torque reqTq is calculated based on Eq. (26) below.

$$reqTq = reqF * TireR * Gratio \quad (26)$$

Note that reqF in Eq. (26) denotes the requested driving force determined from the degree of opening of the accelerator pedal.

When the vehicle 100 is traveling straight ahead, the driving force of each of the four motors 110 to 116, which drive the wheels 102 to 108, is a quarter (i.e., reqTq/4) of the required motor torque reqTq based on the requested driving force reqF inputted by the driver. Meanwhile, when the vehicle 100 is making a turn, torque vectoring control related to the turn assist control adds the additional torque Tvmot based on the vehicle additional yaw moment Mg to the required motor torque, reqTq/4, for each of the left and right rear wheels 106 and 108. Moreover, torque vectoring control related to the left-right rotation difference control adds the command left front wheel rotation rate synchronization torque Tadj_l and the command right front wheel rotation rate synchronization torque Tadj_r to the required motor torques, reqTq/4, for the left and right front wheels 102 and 104, respectively.

For example, when the vehicle 100 makes a right turn, a command motor torque for the left rear wheel 106 is the sum of the required motor torque, reqTq/4, in the case of straight-ahead travel and the additional torque Tvmot, while a command motor torque for the right rear wheel 108 has a value obtained by subtracting the additional torque Tvmot from the required motor torque, reqTq/4, in the case of the straight-ahead travel. In addition, because the command left front wheel rotation rate synchronization torque Tadj_l is 0 (i.e., Tadj_l=0), a command motor torque for the left front wheel 102 remains the same as the required motor torque, reqTq/4, in the case of the straight-ahead travel, while a command motor torque for the right front wheel 104 is the sum of the required motor torque, reqTq/4, in the case of the straight-ahead travel and the command right front wheel rotation rate synchronization torque Tadj_r.

Similarly, when the vehicle 100 makes a left turn, the command motor torque for the right rear wheel 108 is the sum of the required motor torque, reqTq/4, in the case of the straight-ahead travel and the additional torque Tvmot, while the command motor torque for the left rear wheel 106 has a value obtained by subtracting the additional torque Tvmot from the required motor torque, reqTq/4, in the case of the straight-ahead travel. In addition, the command motor torque for the left front wheel 102 is the sum of the required motor torque, reqTq/4, in the case of the straight-ahead travel, and the command left front wheel rotation rate synchronization torque Tadj_l, while the command motor torque for the right front wheel 104 remains the same as the required motor torque, reqTq/4, in the case of the straight-ahead travel, because the command right front wheel rotation rate synchronization torque Tadj_r is 0 (i.e., Tadj_r=0).

Accordingly, the command motor torques for the respective motors 110 to 116 when the vehicle 100 makes a turn are expressed by Eqs. (27), (28), (29), and (30) below. Based on Eqs. (27) to (30), the required motor torque computer 242 calculates the command motor torque TqmotFl for the left front wheel 102, the command motor torque TqmotFr for the right front wheel 104, the command motor torque TqmotRl for the left rear wheel 106, and the command motor torque TqmotRr for the right rear wheel 108 (hereinafter referred to also as command motor torques Tqmot collectively).

$$TqmotFl = reqTq/4 + Tadj\_l \quad (27)$$

$$TqmotFr = regTq/4 + Tadj\_r \quad (28)$$

$$TqmotRl = reqTq/4 - (\pm Tvmot) \quad (29)$$

$$TqmotRr = reqTq/4 + (\pm Tvmot) \quad (30)$$

Note that the sign of the additional torque Tvmot in each of Eqs. (29) and (30) is set in accordance with the direction of the turn.

The inverter controller individually controls the motors that drive the respective wheels 102 to 108 based on the command motor torques Tqmot. In one implementation, the inverter controller may serve as a "motor controller". More specifically, the inverter controller controls the operations of the motors 110 to 116 to cause the motors 110 to 116 to drive the wheels 102 to 108 in accordance with the command motor torques Tqmot.

2-2. Processing Performed by Apparatus

Next, processing performed by the control apparatus 200 of the vehicle according to the present implementation will now be described below.

(Overall Processing)

Figure 10:
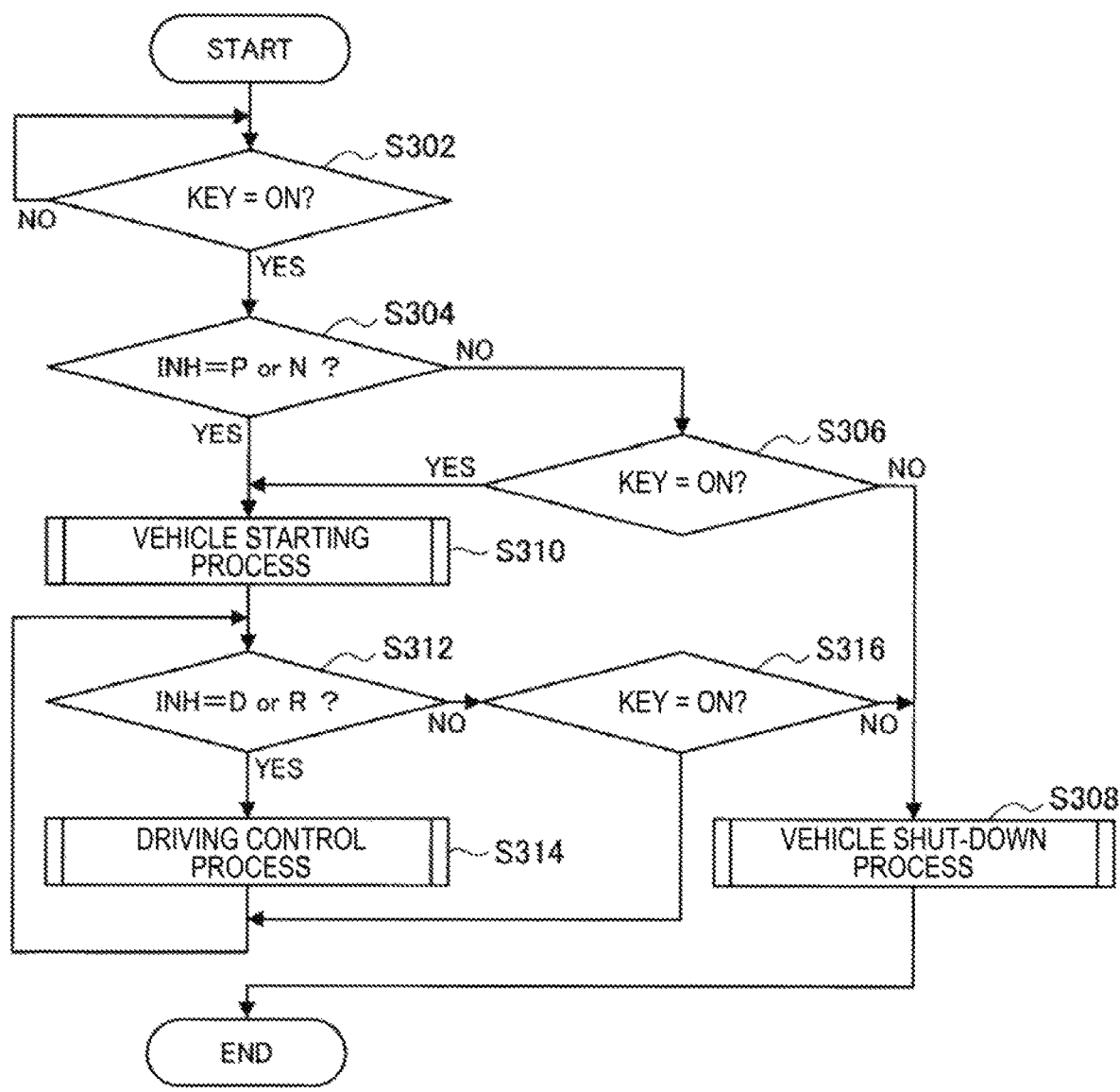
FIG. 10 is a flowchart schematically illustrating overall processing performed by the control apparatus of the vehicle according to the present implementation.

First, with reference to FIG. 10, overall processing performed by the control apparatus 200 of the vehicle according to the present implementation will now be described below. FIG. 10 is a flowchart schematically illustrating the overall processing performed by the control apparatus 200 of the vehicle according to the present implementation.

First, the control apparatus 200 determines whether an ignition key (i.e., an ignition SW) is in an ON position (step S302). If the ignition key is not in the ON position, control returns to step S302.

If the ignition key is in the ON position, the control apparatus 200 determines whether or not information obtained from the inhibitor position sensor (INH) 152 indicates a P (parking) or N (neutral) position (step S304).

If the information obtained from the INH 152 does not indicate the P (parking) or N (neutral) position, the control apparatus 200 determines whether the ignition key is in the ON position (step S306). If the ignition key is in the ON position, control proceeds to step S310.

If it is determined at step S306 that the ignition key is not in the ON position, the control apparatus 200 performs a process of shutting down the vehicle 100 (step S308), and the processing is finished.

If the information obtained from the INH 152 indicates the P (parking) or N (neutral) position, the control apparatus 200 performs a process of starting the vehicle 100 (step S310).

Next, the control apparatus 200 determines whether or not the information obtained from the INH 152 indicates a D (drive) or R (reverse) position (step S312).

If the information obtained from the INH 152 indicates the D (drive) or R (reverse) position, the control apparatus 200 performs a driving control process (step S314). Details thereof will be described below with reference to a flowchart illustrated in FIG. 11.

If the information obtained from the INH 152 does not indicate the D (drive) or R (reverse) position, the control apparatus 200 determines whether the ignition key is in the ON position (step S316). If the ignition key is in the ON position, control returns to step S312. If the ignition key is not in the ON position, control proceeds to step S308.

(Driving Control Process)

Figure 11:
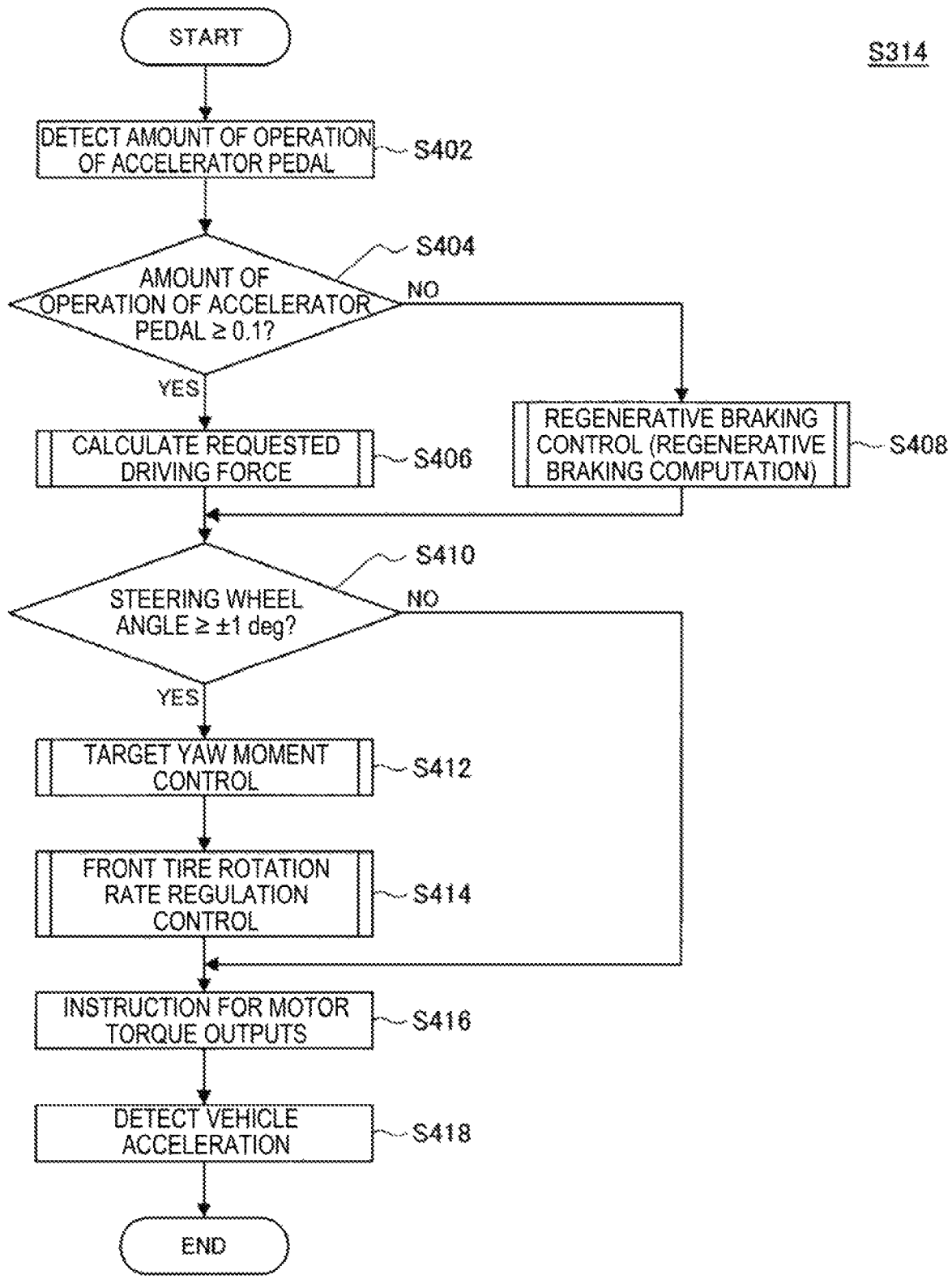
FIG. 11 is a flowchart schematically illustrating a whole driving control process performed by the control apparatus of the vehicle according to the present implementation.

Next, with reference to FIG. 11, the whole driving control process (step S314) performed by the control apparatus 200 will now be described below. FIG. 11 is a flowchart schematically illustrating the whole driving control process performed by the control apparatus 200 of the vehicle according to the present implementation.

First, the control apparatus 200 detects the amount (i.e., an accelerator opening degree) of an operation of the accelerator pedal by the driver from a measured value of the accelerator opening degree sensor 154 (step S402).

Next, the control apparatus 200 determines whether the amount of the operation of the accelerator pedal is equal to or greater than 0.1 (step S404).

If it is determined that the amount of the operation of the accelerator pedal is equal to or greater than 0.1, the control apparatus 200 calculates the requested driving force reqF based on the amount of the operation of the accelerator pedal (step S406). Note that the calculation of the requested driving force reqF may be performed based on, for example, a map that defines the relationship between the accelerator opening degree and the requested driving force reqF.

If it is determined that the amount of the operation of the accelerator pedal is smaller than 0.1, the control apparatus 200 performs regenerative braking control on each of the motors 110 to 116 (step S408).

Next, the control apparatus 200 determines whether the absolute value of the steering wheel angle θ measured by the steering wheel angle sensor 140 is equal to or greater than 1 (deg) (step S410).

If the absolute value of the steering wheel angle θ is equal to or greater than 1 (deg), the control apparatus 200 performs target yaw moment control (step S412). More specifically, the control apparatus 200 calculates the additional torque Tvmot by the above-described method related to the turn assist control. Details thereof will be described below with reference to a flowchart illustrated in FIG. 14.

Next, the control apparatus 200 performs the front tire rotation rate regulation control (i.e., the left-right rotation difference control) (step S414). More specifically, the control apparatus 200 calculates the command left front wheel rotation rate synchronization torque Tadj_l and the command right front wheel rotation rate synchronization torque Tadj_r by the above-described method related to the left-right rotation difference control. Details thereof will be described below with reference to a flowchart illustrated in FIG. 16.

Next, the control apparatus 200 issues an instruction to output the motor torques (step S416). More specifically, the control apparatus 200 calculates the command motor torques for the respective motors 110 to 116 based on the additional torque Tvmot, the command left front wheel rotation rate synchronization torque Tadj_l, and the command right front wheel rotation rate synchronization torque Tadj_r, and instructs the motors 110 to 116 to produce corresponding outputs.

Next, the control apparatus 200 detects an acceleration of the vehicle 100 (step S418). More specifically, the control apparatus 200 detects the acceleration of the vehicle 100 from information obtained from the longitudinal acceleration sensor 146 and the lateral acceleration sensor 148.

(Process of Calculating Yaw Rate Model Value)

Figure 12:
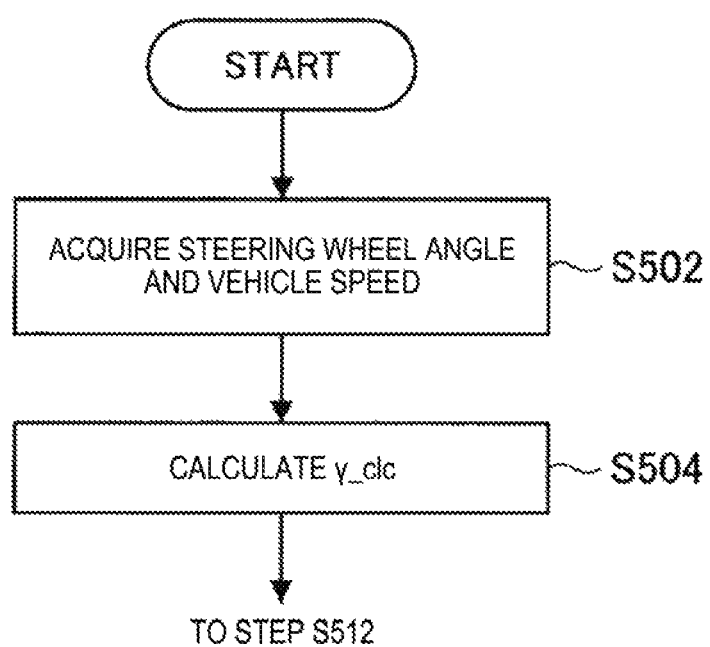
FIG. 12 is a flowchart schematically illustrating a process of calculating a yaw rate model value performed by the control apparatus of the vehicle according to the present implementation.

Next, with reference to FIG. 12, a process of calculating the yaw rate model value, which is a part of the target yaw moment control process (step S412) performed by the control apparatus 200, will now be described below. FIG. 12 is a flowchart schematically illustrating the process of calculating the yaw rate model value performed by the control apparatus 200 of the vehicle according to the present implementation.

The control apparatus 200 acquires the steering wheel angle θ and the vehicle speed V (step S502). Next, the control apparatus 200 calculates the yaw rate model value $\gamma\_clc$ from Eqs. (5) to (8) mentioned above based on the steering wheel angle θ and the vehicle speed V (step S504). Note that the calculated yaw rate model value $\gamma\_clc$ is used in step S512 in FIG. 13 and step S526 in FIG. 14.

(Process of Reducing Yaw Rate Noise)

Figure 13:
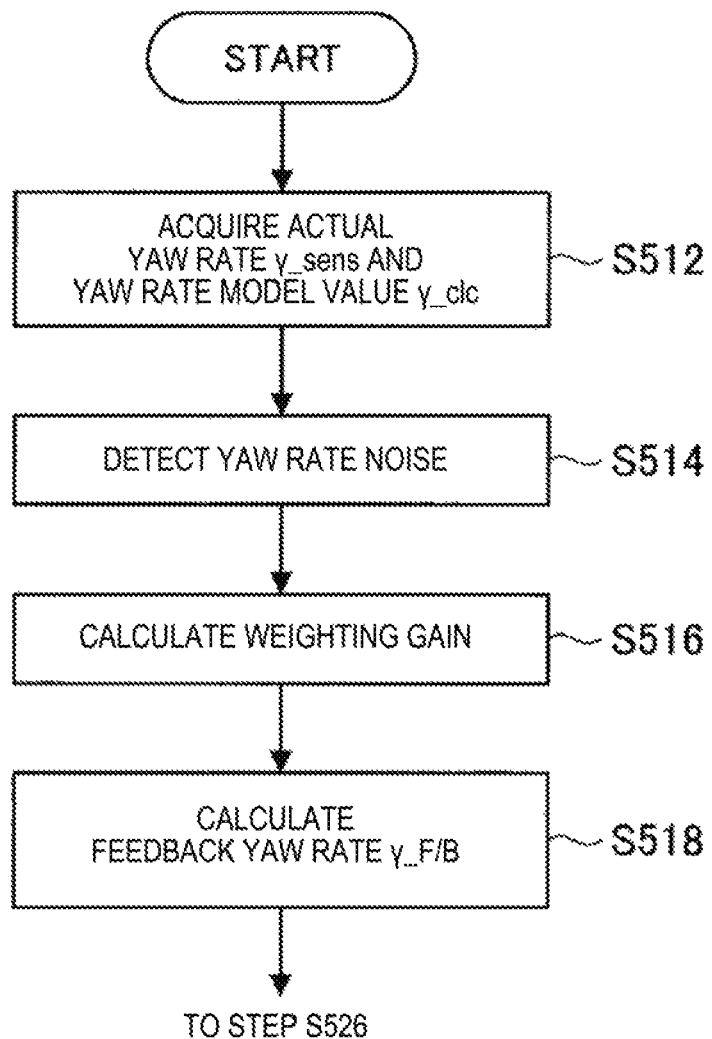
FIG. 13 is a flowchart schematically illustrating a process of reducing yaw rate noise performed by the control apparatus of the vehicle according to the present implementation.

Next, with reference to FIG. 13, a process of reducing the yaw rate noise, which is a part of the target yaw moment control process (step S412) performed by the control apparatus 200, will now be described below. FIG. 13 is a flowchart schematically illustrating the process of reducing the yaw rate noise performed by the control apparatus 200 of the vehicle according to the present implementation.

The control apparatus 200 acquires the actual yaw rate $\gamma\_sens$ and the yaw rate model value $\gamma\_clc$ (step S512). Next, the control apparatus 200 calculates the difference γ_diff between the actual yaw rate γ_sens and the yaw rate model value γ_clc to detect the yaw rate noise (step S514). Next, the control apparatus 200 calculates the weighting gain a based on the gain map illustrated in FIG. 8 (step S516). Next, the control apparatus 200 calculates the feedback yaw rate γ_F/B from Eq. (11) mentioned above (step S518). Note that the calculated feedback yaw rate γ_F/B is used to calculate the difference Δγ at step S526 in FIG. 14.

(Target Yaw Moment Control Process)

Figure 14:
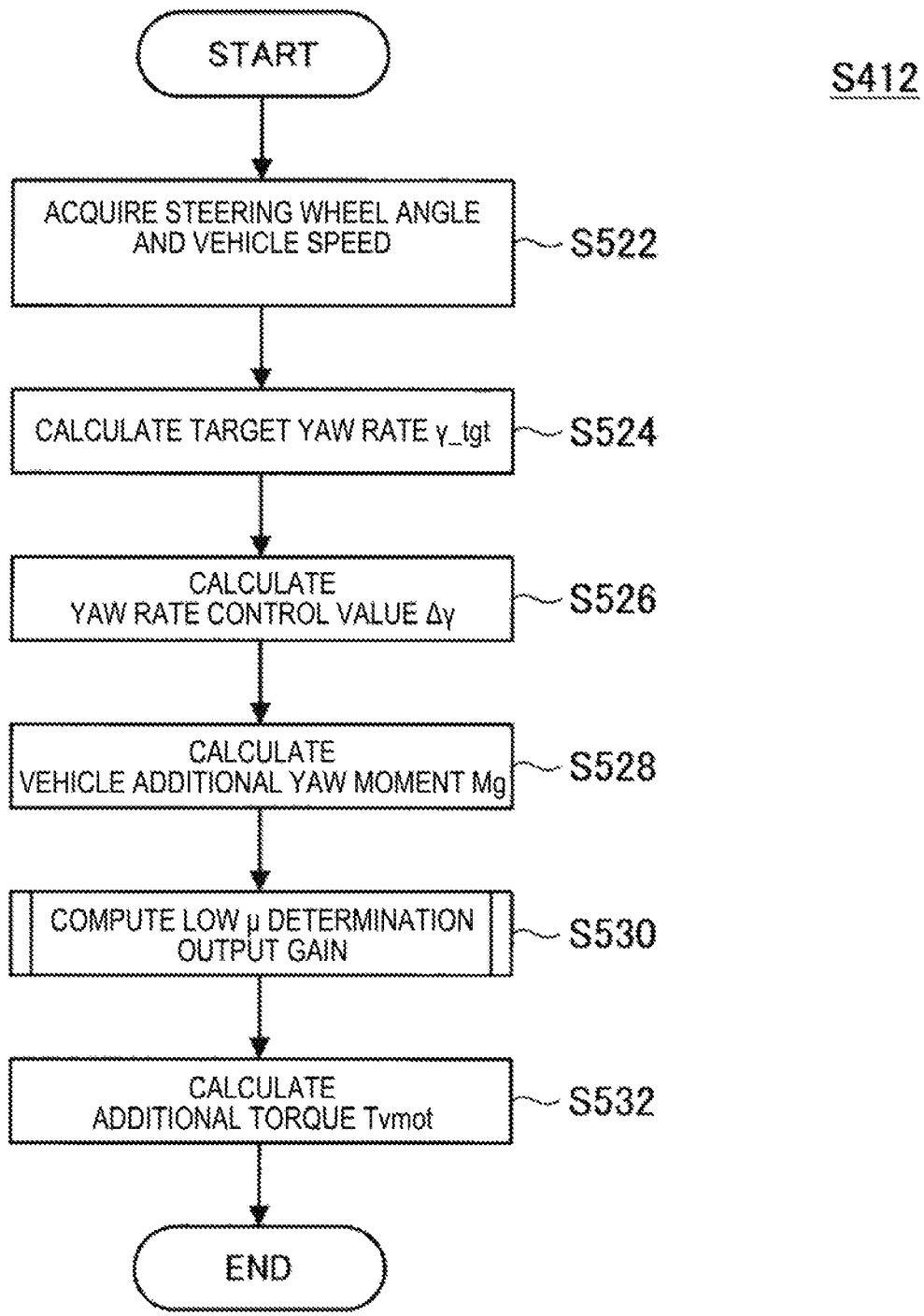
FIG. 14 is a flowchart schematically illustrating a target yaw moment control process performed by the control apparatus of the vehicle according to the present implementation.

Next, with reference to FIG. 14, the target yaw moment control process (step S412) performed by the control apparatus 200 will now be described below. FIG. 14 is a flowchart schematically illustrating the target yaw moment control process performed by the control apparatus 200 of the vehicle according to the present implementation.

The control apparatus 200 acquires the steering wheel angle θ and the vehicle speed V (step S522). Next, the control apparatus 200 calculates the target yaw rate γ_tgt from Eqs. (2) to (4) mentioned above based on the steering wheel angle θ and the vehicle speed V (step S524). Next, the control apparatus 200 calculates the difference Δγ between the target yaw rate γ_tgt and the feedback yaw rate γ_F/B from Eq. (12) mentioned above (step S526). Next, the control apparatus 200 calculates the vehicle additional yaw moment Mg from Eq. (13) mentioned above (step S528). Next, the control apparatus 200 computes the low μ determination output gain (step S530). Details thereof will be described below with reference to the flowchart illustrated in FIG. 15. Next, the control apparatus 200 calculates the additional torque Tvmot from Eqs. (24) and (25) mentioned above (step S532). Note that, based on the calculated additional torque Tvmot, the command motor torques for the left and right rear wheels 106 and 108, respectively, are calculated at step S416 in FIG. 11.

(Process of Calculating Low μ Determination Output Gain)

Figure 15:
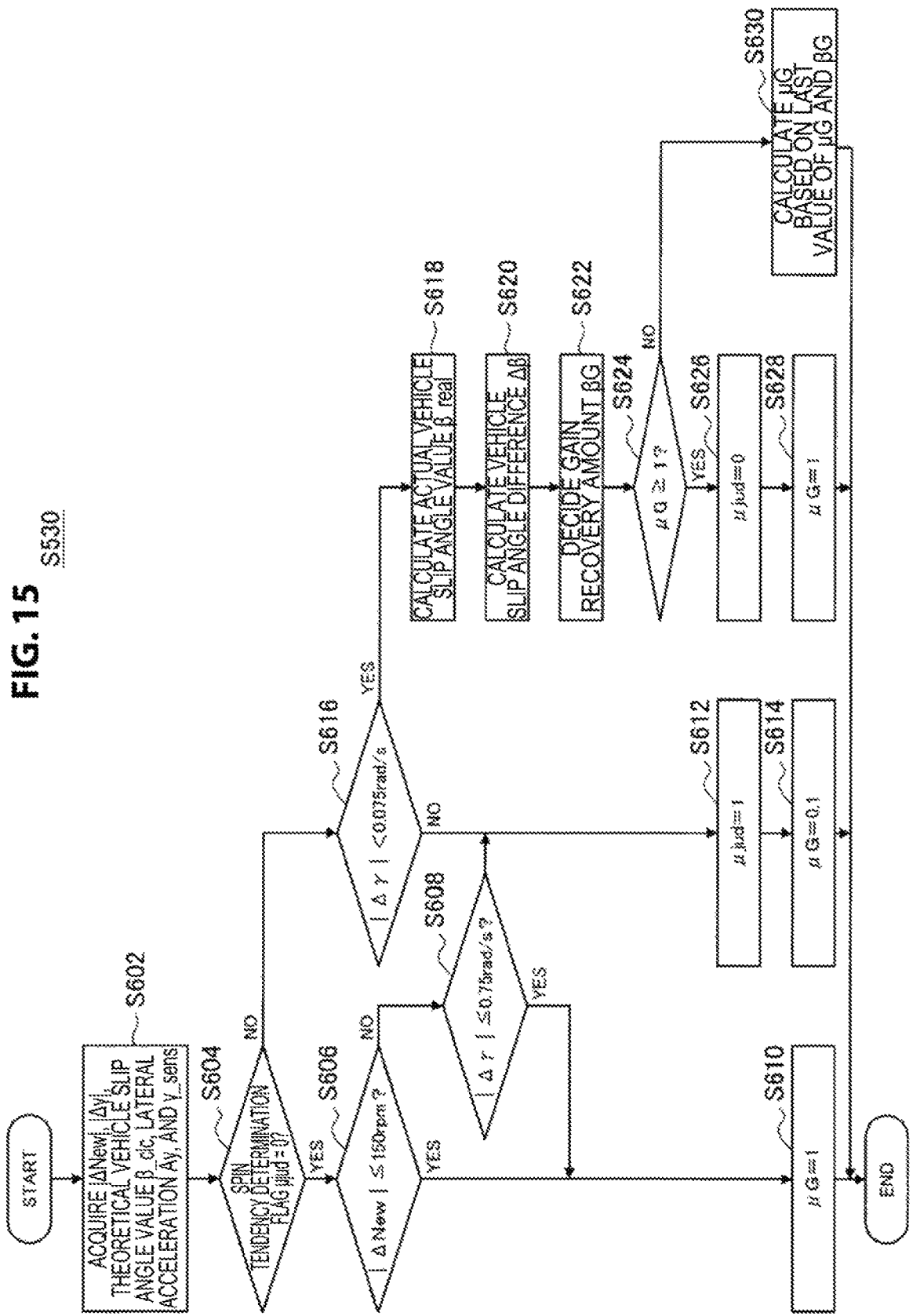
FIG. 15 is a flowchart schematically illustrating a process of calculating the low μ determination output gain performed by the control apparatus of the vehicle according to the present implementation.

Next, with reference to FIG. 15, a process of calculating the low μ determination output gain (step S530) performed by the control apparatus 200 will now be described below. FIG. 15 is a flowchart schematically illustrating the process of calculating the low μ determination output gain performed by the control apparatus 200 of the vehicle according to the present implementation.

The control apparatus 200 acquires |ΔNew|, |Δγ|, the theoretical vehicle slip angle value β_clc, the lateral acceleration Ay, and the actual yaw rate γ_sens (step S602).

Next, the control apparatus 200 determines whether the spin tendency determination flag μjud indicates 0 (step S604).

If it is determined that the spin tendency determination flag μjud indicates 0, the control apparatus 200 determines whether or not |ΔNew| is equal to or smaller than 150 (rpm) (step S606). If it is determined that |ΔNew| exceeds 150 (rpm), the control apparatus 200 determines whether or not |Δγ| is equal to or smaller than 0.75 (rad/s) (step S608).

If it is determined that |ΔNew| is equal to or smaller than 150 (rpm) or that |Δγ| is equal to or smaller than 0.75 (rad/s), the control apparatus 200 sets the low μ determination output gain μG to 1 (step S610).

If it is determined that |ΔNew| exceeds 150 (rpm) and |Δγ| exceeds 0.75 (rad/s), the control apparatus 200 sets the spin tendency determination flag μjud to 1 (step S612), and sets the low μ determination output gain μG to 0.1 (step S614).

If it is determined at step S604 that the spin tendency determination flag μjud does not indicate 0, the control apparatus 200 determines whether or not |Δγ| is smaller than 0.075 (rad/s) (step S616). If it is determined that |Δγ| is equal to or greater than 0.075 (rad/s), control proceeds to steps S612 and S614.

If it is determined that |Δγ| is smaller than 0.075 (rad/s), the control apparatus 200 calculates the actual vehicle slip angle value β_real from Eq. (15) mentioned above (step S618), and calculates the difference Δβ between the theoretical vehicle slip angle value β_clc and the actual vehicle slip angle value β_real from Eq. (16) mentioned above (step S620). Note that the actual vehicle slip angle value β_real and the difference Δβ may be acquired, instead of being calculated.

Next, the control apparatus 200 decides the gain recovery amount βG based on the gain map illustrated in FIG. 9 (step S622).

Next, the control apparatus 200 determines whether or not the low μ determination output gain μG is equal to or greater than 1 (step S624), and if it is determined that the low μ determination output gain μG is equal to or greater than 1, the control apparatus 200 sets the spin tendency determination flag μjud to 0 (step S626), and sets the low μ determination output gain μG to 1 (step S628). Meanwhile, if it is determined that the low μ determination output gain μG is smaller than 1, the control apparatus 200 calculates the low μ determination output gain μG from Eq. (17) mentioned above based on the last value μG' of the low μ determination output gain and the gain recovery amount βG (step S630).

(Front Tire Rotation Rate Regulation Control Process)

Figure 16:
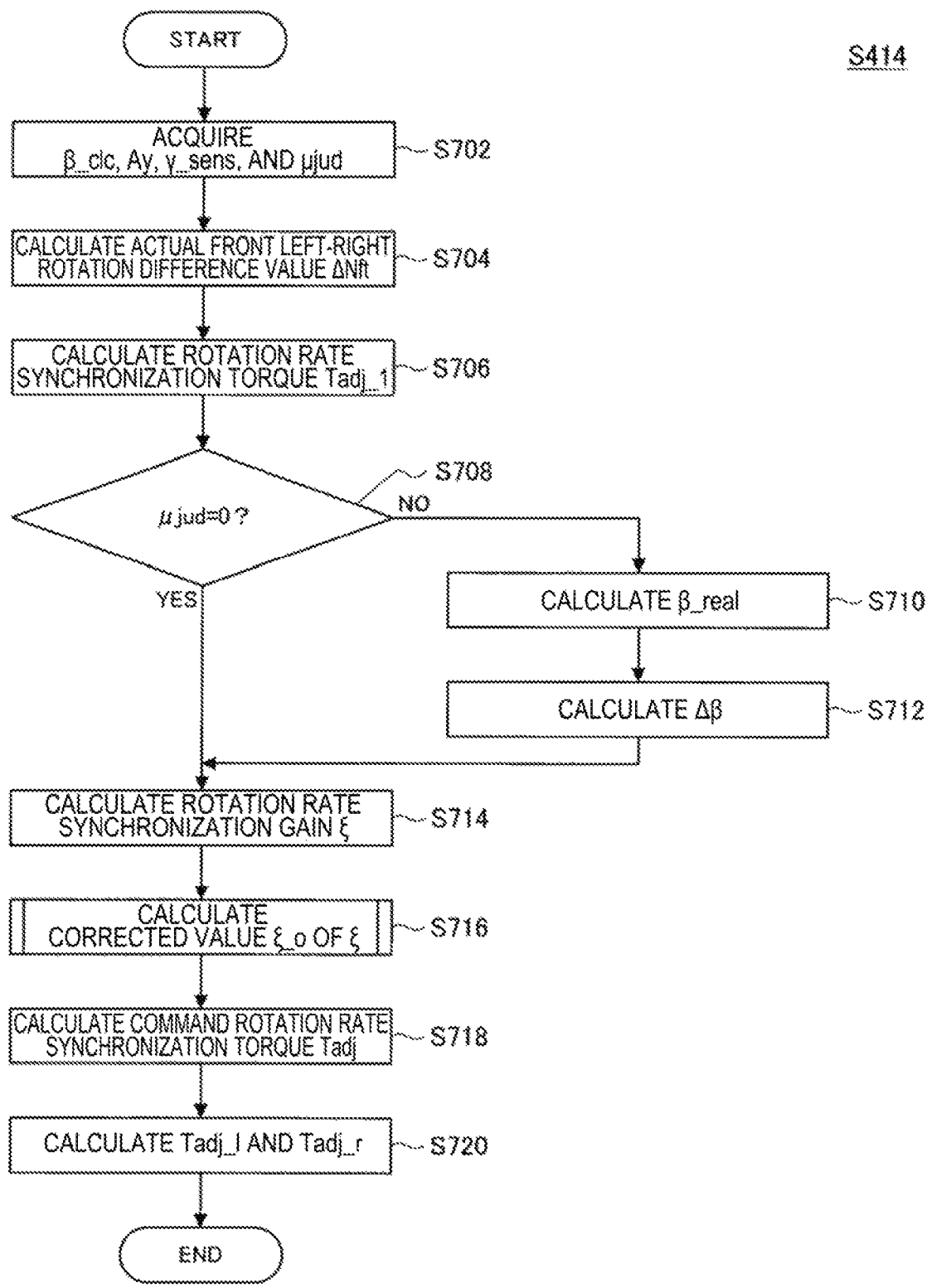
FIG. 16 is a flowchart schematically illustrating a front tire rotation rate regulation control process performed by the control apparatus of the vehicle according to the present implementation.

Next, with reference to FIG. 16, a front tire rotation rate regulation control process (step S414) performed by the control apparatus 200 will now be described below. FIG. 16 is a flowchart schematically illustrating the front tire rotation rate regulation control process performed by the control apparatus 200 of the vehicle according to the present implementation.

The control apparatus 200 acquires the theoretical vehicle slip angle value β_clc, the lateral acceleration Ay, the actual yaw rate γ_sens, and the spin tendency determination flag μjud (step S702).

Next, the control apparatus 200 calculates the actual front left-right rotation difference value ΔNft from Eq. (19) mentioned above (step S704), and calculates the front wheel rotation rate synchronization torque Tadj_1 from Eq. (20) mentioned above (step S706).

Next, the control apparatus 200 determines whether the spin tendency determination flag μjud indicates 0 (step S708), and if it is determined that the spin tendency determination flag μjud does not indicate 0, the control apparatus 200 calculates the actual vehicle slip angle value β_real (step S710), and calculates the difference Δβ (step S712), as in steps S618 and S620.

If it is determined that the spin tendency determination flag μjud indicates 0, or after the difference Δβ is calculated or acquired, the control apparatus 200 calculates the rotation rate synchronization gain ξ based on Table 1 mentioned above (step S714).

Next, the control apparatus 200 calculates the corrected value ξ_o of the rotation rate synchronization gain ξ (step S716). Details thereof will be described below with reference to a flowchart illustrated in FIG. 17.

Next, the control apparatus 200 calculates the command rotation rate synchronization torque Tadj from Eq. (23) mentioned above (step S718), and calculates the command left front wheel rotation rate synchronization torque Tadj_l and the command right front wheel rotation rate synchronization torque Tadj_r (step S720).

(Rotation Rate Synchronization Gain Correction Computation Process)

Figure 17:
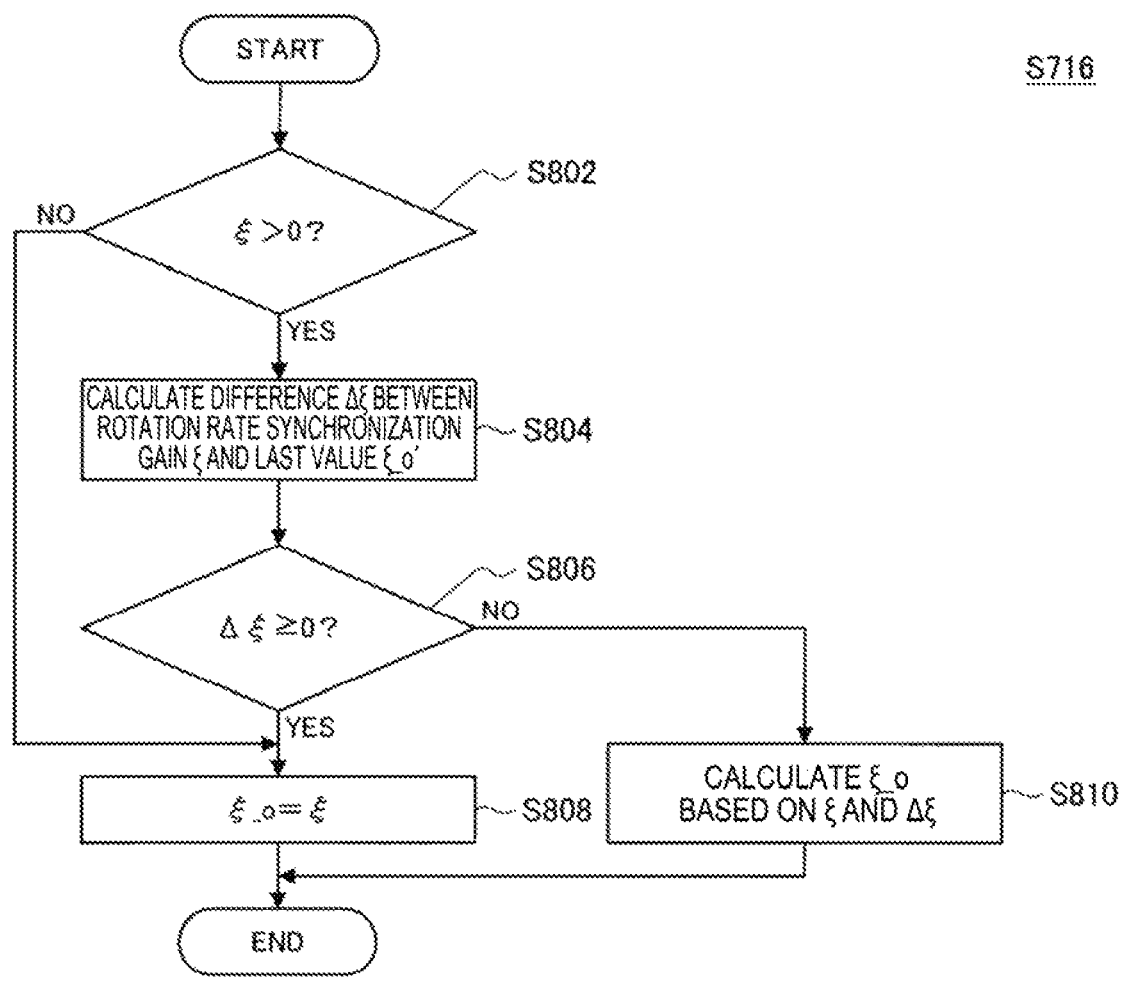
FIG. 17 is a flowchart schematically illustrating a rotation rate synchronization gain correction computation process performed by the control apparatus of the vehicle according to the present implementation.

Next, with reference to FIG. 17, a rotation rate synchronization gain correction computation process (step S716) performed by the control apparatus 200 will now be described below. FIG. 17 is a flowchart schematically illustrating the rotation rate synchronization gain correction computation process performed by the control apparatus 200 of the vehicle according to the present implementation.

The control apparatus 200 determines whether the rotation rate synchronization gain ξ is greater than 0 (step S802), and if it is determined that the rotation rate synchronization gain ξ is greater than 0, the control apparatus 200 calculates the difference Δξ between the rotation rate synchronization gain ξ and the last value ξ_o' of the rotation rate synchronization gain ξ from Eq. (21) (step S804).

Next, the control apparatus 200 determines whether or not the difference Δξ is equal to or greater than 0 (step S806), and if it is determined that the difference Δξ is equal to or greater than 0, the control apparatus 200 sets the rotation rate synchronization gain ξ as the corrected rotation rate synchronization gain ξ_o (step S808). If it is determined that the difference Δξ is smaller than 0, the control apparatus 200 calculates the corrected rotation rate synchronization gain ξ_o from Eq. (22) based on the rotation rate synchronization gain ξ and the difference Δξ (step S810).

2-3. Example Result of Application

The processing performed by the control apparatus 200 according to the present implementation has been described above. Next, an example result of application of the control according to the present implementation will now be described below.

Figure 18:
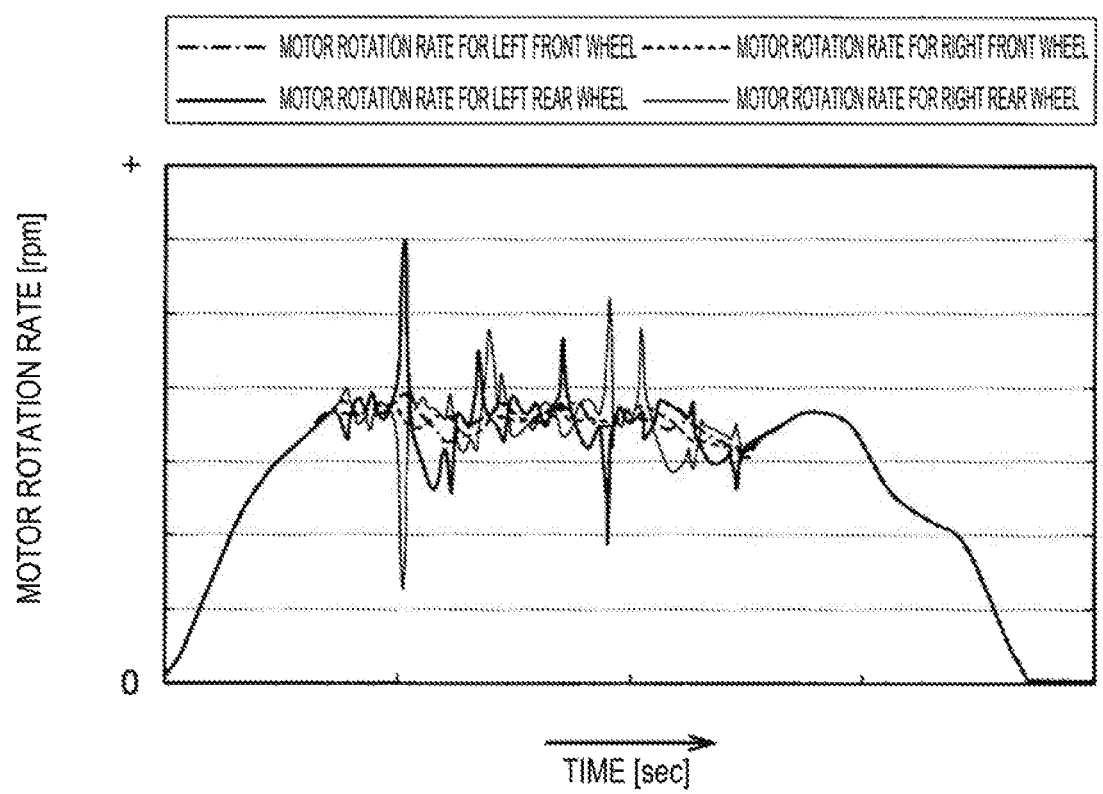
FIG. 18 is a diagram illustrating changes over time in rotation rate of each of motors when only known turn assist control is applied.
Figure 19:
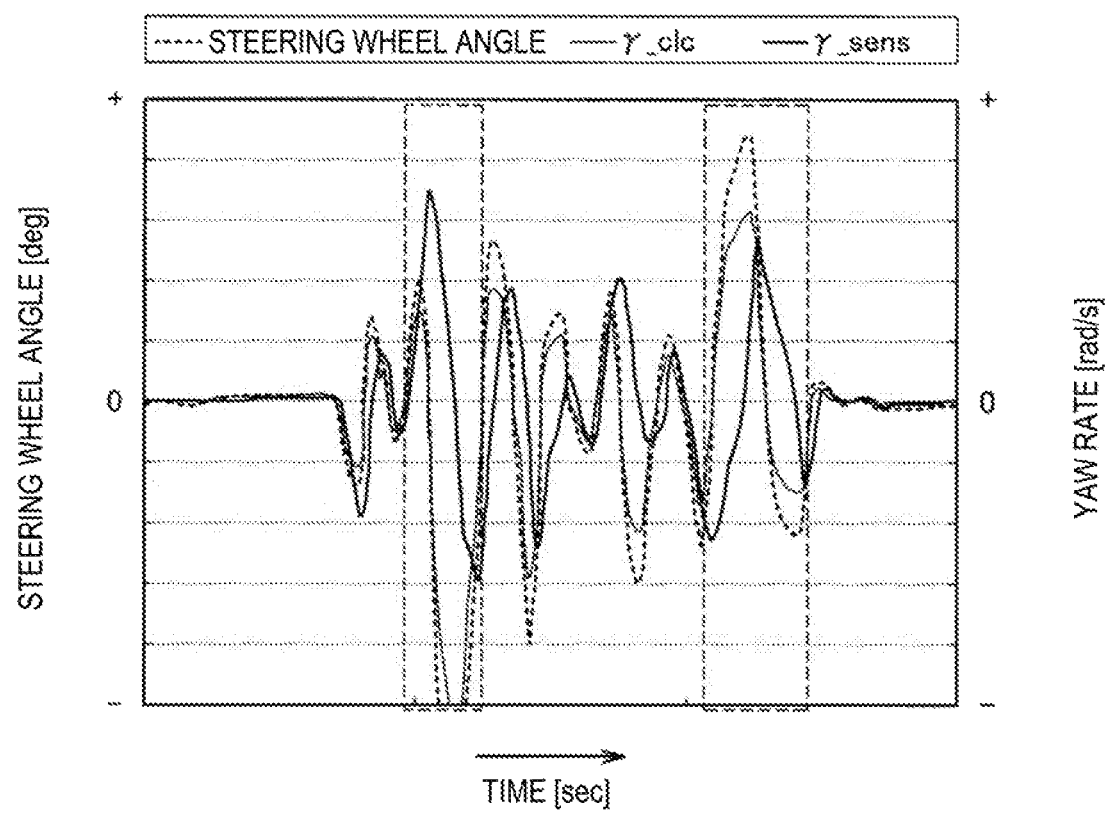
FIG. 19 illustrates changes over time in a steering wheel angle, a yaw rate model value, and an actual yaw rate when only the known turn assist control is applied.
Figure 20:
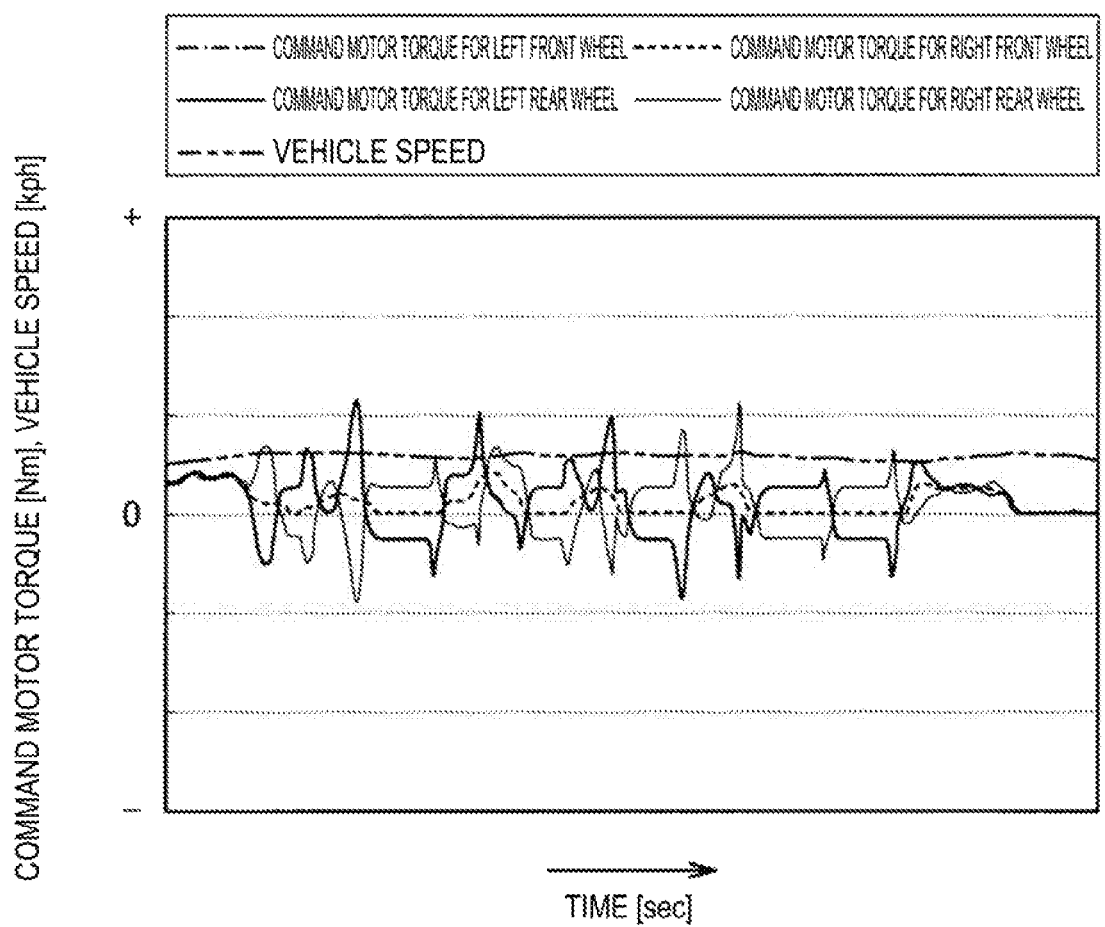
FIG. 20 illustrates changes over time in each of command motor torques and a vehicle speed when only the known turn assist control is applied.

First, with reference to FIGS. 18, 19, and 20, various characteristics of the vehicle in the case where only known turn assist control is applied will now be described below. FIGS. 18 to 20 are each a diagram illustrating characteristics of the vehicle in the case where a slalom drive has been carried out on a low μ road surface (e.g., on a snow-covered road). FIG. 18 is a diagram illustrating changes over time in the rotation rate of each of the motors 110 to 116. FIG. 19 illustrates changes over time in the steering wheel angle θ, the yaw rate model value γ_clc, and the actual yaw rate γ_sens. FIG. 20 illustrates changes over time in the command motor torques (i.e., TqmotFl, TqmotFr, TqmotRl, and TqmotRr) and the vehicle speed V.

Referring to FIG. 18, a significant difference is observed between the motor rotation rate for the left front wheel and the motor rotation rate for the right front wheel, which means that a significant difference has occurred between the rotation rates of the left and right front wheels 102 and 104. Accordingly, a yaw moment that causes a convergence of the yaw rate has not occurred, with the result that the behavior of the vehicle remains unstable. In addition, referring to FIG. 19, significant deviations are observed between the steering wheel angle θ, the yaw rate model value γ_clc, and the actual yaw rate γ_sens in areas enclosed by dotted lines. This means a disagreement between the operation of the steering wheel by the driver and the behavior of the vehicle, and suggests a likelihood of an uncomfortable feeling of the driver. Further, as illustrated in FIG. 20, the left-right rotation difference control is not performed, and the command motor torques for the left and right front wheels 102 and 104 accordingly have the same values.

Figure 21:
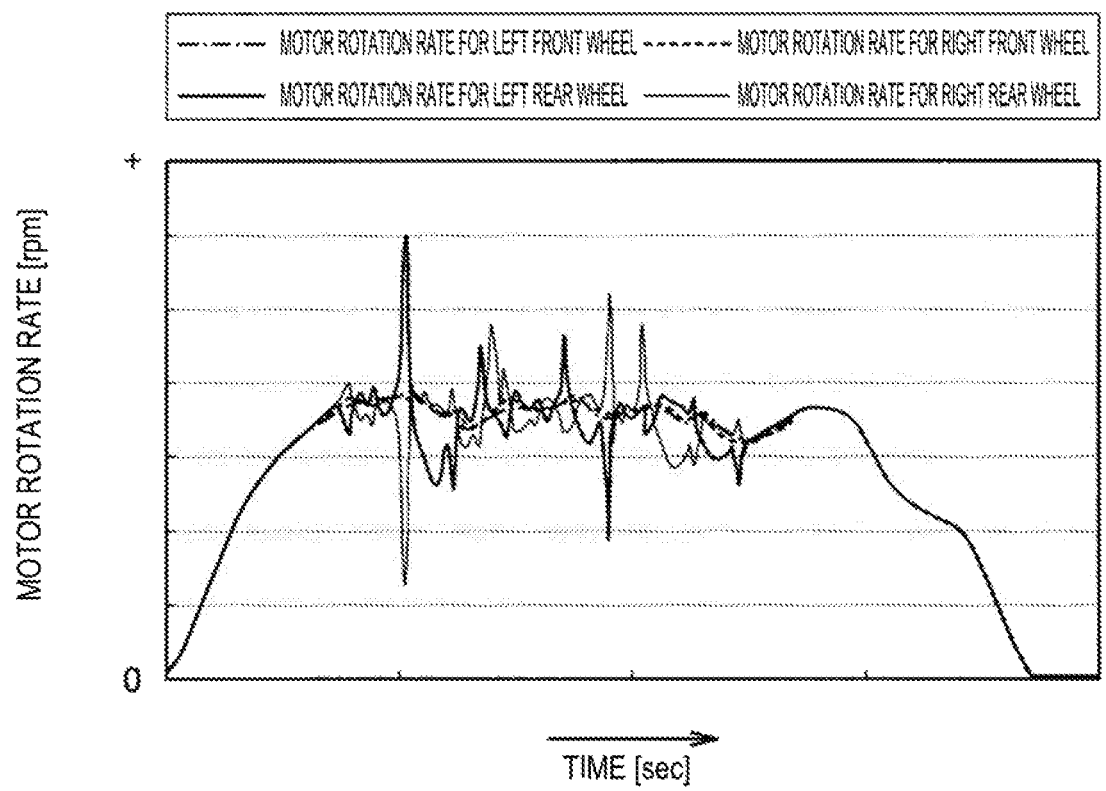
FIG. 21 illustrates changes over time in the rotation rate of each of the motors when left-right rotation difference control according to the present implementation is applied.
Figure 22:
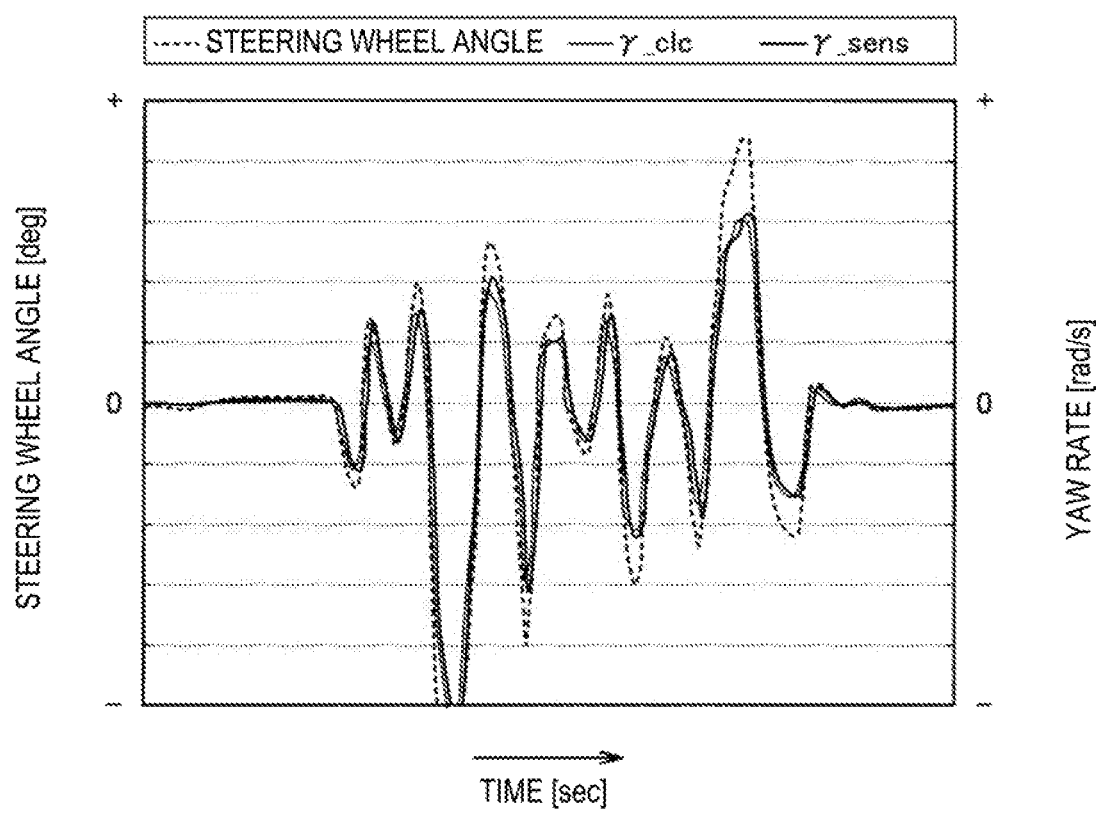
FIG. 22 illustrates changes over time in the steering wheel angle, the yaw rate model value, and the actual yaw rate when the left-right rotation difference control according to the present implementation is applied.
Figure 23:
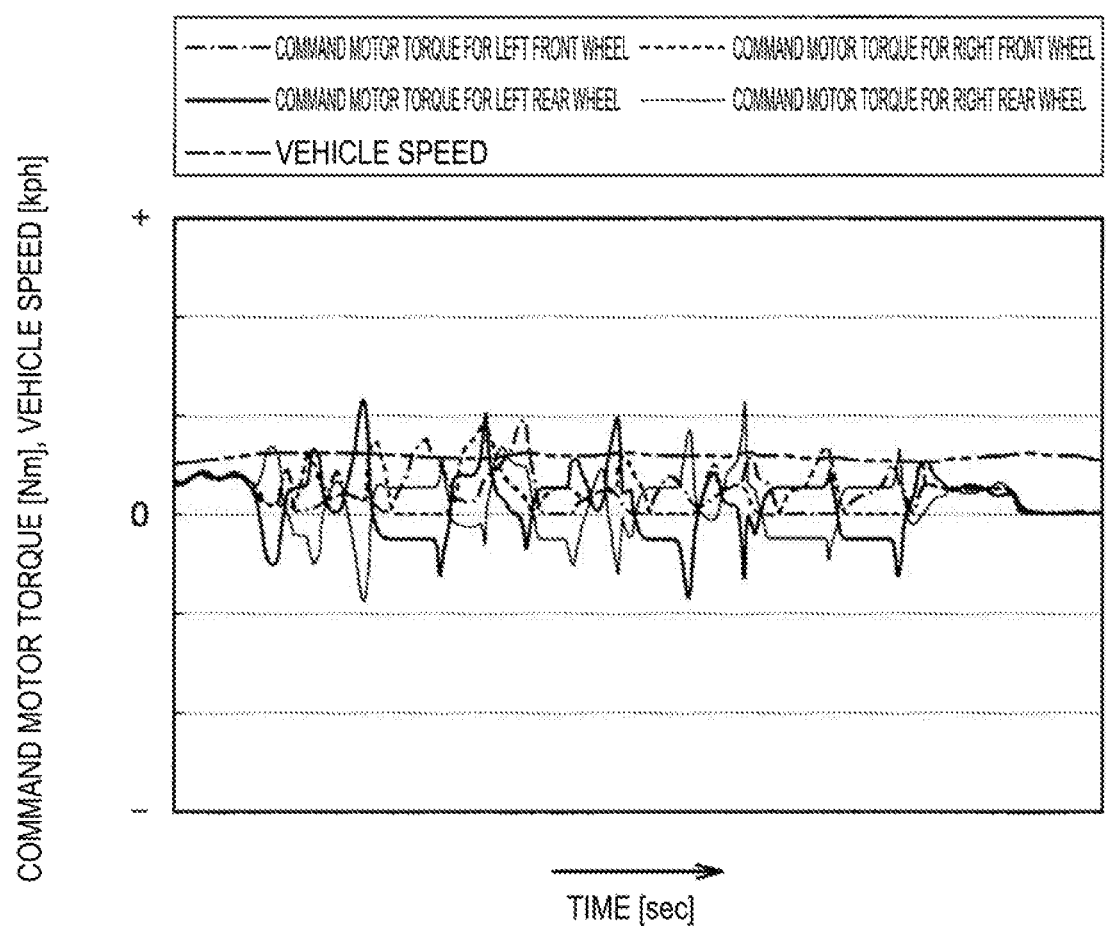
FIG. 23 illustrates changes over time in each of the command motor torques and the vehicle speed when the left-right rotation difference control according to the implementation is applied.

Next, the various characteristics of the vehicle in the case where the left-right rotation difference control according to the present implementation is applied will now be described below with reference to FIGS. 21, 22, and 23. Each of FIGS. 21 to 23 is also a diagram illustrating characteristics of the vehicle in the case where a slalom drive has been carried out on a low μ road surface (e.g., on a snow-covered road). FIG. 21 illustrates changes over time in the rotation rate of each of the motors 110 to 116, as does FIG. 18. FIG. 22 illustrates changes over time in the steering wheel angle θ, the yaw rate model value γ_clc, and the actual yaw rate γ_sens, as does FIG. 19. FIG. 23 illustrates changes over time in the command motor torques (i.e., TqmotFl, TqmotFr, TqmotRl, and TqmotRr) and the vehicle speed V, as does FIG. 20.

In FIG. 21, in comparison with FIG. 18, a significant difference is not observed between the motor rotation rate for the left front wheel and the motor rotation rate for the right front wheel, which means that the rotation rates of the left and right front wheels 102 and 104 are substantially the same. Thus, a yaw moment acting in a direction opposite to that of the yaw moment of inertia is generated to cause a convergence of the yaw rate to stabilize the behavior of the vehicle. In addition, in FIG. 22, in comparison with FIG. 19, significant deviations are not observed between the steering wheel angle θ, the yaw rate model value γ_clc, and the actual yaw rate γ_sens at any time, which suggests proper control of the actual yaw rate γ_sens. This means an agreement between the operation of the steering wheel by the driver and the behavior of the vehicle, and contributes to preventing an uncomfortable feeling of the driver and improving an operational feeling of the driver. Further, in FIG. 23, in comparison with FIG. 20, the command motor torques for the left and right front wheels 102 and 104 are controlled in an asynchronous manner. This means that the motor torques are controlled in such a manner that the difference between the rotation rates of the left and right front wheels 102 and 104 will be reduced, and this leads to stabilizing the behavior of the vehicle.

3. CONCLUSION

As described above, according to one implementation of the present invention, the control apparatus 200 decides the additional yaw moment based on the yaw rate of the vehicle, makes a determination as to the spin tendency of the vehicle, decides the rotation difference control amount for controlling the difference in rotation between the left and right front wheels of the vehicle so as to reduce the difference in rotation when the vehicle is determined to have the spin tendency, decides the rear wheel braking/driving force control amount for controlling the braking/driving forces of the rear wheels of the vehicle based on the additional yaw moment, and decides the front wheel braking/driving force control amount for controlling the braking/driving forces of the front wheels of the vehicle based on the rotation difference control amount. Accordingly, when the vehicle has come to have the spin tendency when traveling on a low μ road surface, the difference in rotation between the left and right front wheels is reduced, so that a yaw moment acting in such a direction as to prevent or reduce oversteer is generated to reduce the spin tendency of the vehicle and stabilize the behavior of the vehicle. Moreover, when the vehicle is traveling on a high μ road surface, a yaw moment is additionally applied to the vehicle to provide assistance in a turn of the vehicle, so that the turning performance of the vehicle is improved. Therefore, an improvement in turning performance of the vehicle on a high μ road surface and an improvement in the stability of the behavior of the vehicle on a low μ road surface can both be achieved.

In addition, the control apparatus 200 acquires a first vehicle slip angle of the vehicle, the first vehicle slip angle being determined from information obtained from sensors related to the velocity of the vehicle, and decides the rotation difference control amount based on the first vehicle slip angle. Thus, the left-right rotation difference control is performed in accordance with the degree of the spin tendency of the vehicle estimated from the vehicle slip angle, and this contributes to preventing generation of an excessive or insufficient amount of the yaw moment.

In addition, the control apparatus 200 further acquires a second vehicle slip angle of the vehicle, the second vehicle slip angle being determined from a vehicle model, and decides the rotation difference control amount based on the first vehicle slip angle and the difference between the first and second vehicle slip angles. Here, when there is a difference between the vehicle slip angle estimated from the vehicle model and the actual vehicle slip angle, the amount of the yaw moment generated may be excessive or insufficient. Accordingly, the left-right rotation difference control is performed in accordance with the difference, so that generation of an excessive or insufficient amount of the yaw moment can be more effectively prevented.

In addition, the control apparatus 200 performs control of correcting the rotation difference control amount based on a past value of the rotation difference control amount. Thus, the rotation difference control amount is corrected in accordance with a change in the rotation difference control amount, so that a yaw moment suited to the state of the vehicle can be generated.

In addition, the control apparatus 200 performs the correcting control such that the rotation difference control amount is not corrected when the rotation difference control amount is equal to or greater than a last value of the rotation difference control amount. Thus, when the vehicle has come to have the spin tendency, a required amount of the left-right rotation difference control is performed, so that the behavior of the vehicle can be stabilized in an early stage. Note that the correcting control may be performed such that, when the rotation rate synchronization gain $\xi$, i.e., the rotation difference control amount, is equal to or greater than the last value $\xi\_o$ thereof, the rotation rate synchronization gain $\xi$ is increased within a range not exceeding an upper-limit value, e.g., 1, of the rotation rate synchronization gain $\xi$.

In addition, when the rotation difference control amount is smaller than the last value of the rotation difference control amount, the control apparatus 200 adds, to the rotation difference control amount, a control amount smaller than a difference between the rotation difference control amount and the last value of the rotation difference control amount. Thus, when the rotation difference control amount has been decreased and the spin tendency of the vehicle is varying in the direction of convergence, the rotation difference control amount is gradually reduced to prevent a sharp change in the behavior of the vehicle.

In addition, the control apparatus 200 acquires the first rotation difference between the left and right rear wheels of the vehicle determined from a vehicle model, and the second rotation difference between the left and right rear wheels determined from information obtained from the wheel rotation rate sensors, acquires a first yaw rate determined from a vehicle model and a second yaw rate determined from information obtained from the yaw rate sensor, and makes the determination as to the spin tendency based on the difference between the first and second rotation differences and the difference between the first and second yaw rates. Here, the turn assist control may cause the longitudinal forces of the rear wheels to reach a saturation point, which may lead to reduced accuracy in the determination as to the spin tendency based on the difference in rotation rate between the left and right rear wheels. Accordingly, the determination as to the spin tendency is made additionally based on the yaw rate of the vehicle, which may lead to improved accuracy in the determination as to the spin tendency.

In addition, the control apparatus 200 decides an adjustment gain for the additional yaw moment such that the additional yaw moment is reduced when the vehicle is determined to have the spin tendency. Thus, when the vehicle has the spin tendency, the command motor torques for the rear wheels provided by the turn assist control are reduced, with the result that the longitudinal forces of the rear wheels are reduced, and the maximum permissible amounts of the lateral forces thereof are increased. This contributes to preventing the lateral forces to reach a saturation point, and achieving lateral forces due to the yaw moment generated by the left-right rotation difference control. This, in turn, contributes to preventing or reducing oversteer and preventing a spin of the vehicle.

In addition, the control apparatus 200 varies the adjustment gain such that the additional yaw moment once reduced will be increased over time when the vehicle has come to be without the spin tendency. Thus, when the spin tendency of the vehicle is varying in the direction of convergence, the adjustment gain, i.e., the low μ determination output gain μG, is gradually increased to prevent a sharp change in the behavior of the vehicle.

In addition, when the vehicle has come to be without the spin tendency, the control apparatus 200 varies the adjustment gain based on the difference between the first and second vehicle slip angles in each subsequent iteration of deciding the adjustment gain. Thus, the turn assist control is performed in accordance with the degree of the spin tendency (e.g., the degree of oversteer) of the vehicle estimated from the vehicle slip angle, so that the turning performance of the vehicle can be recovered while preventing a sharp change in the behavior of the vehicle.

In addition, the control apparatus 200 individually controls the motors that drive the left and right rear wheels of the vehicle based on the rear wheel braking/driving force control amount, and individually controls the motors that drive the left and right front wheels of the vehicle based on the front wheel braking/driving force control amount. Thus, the motors are used to drive the wheels, and a time required to drive each wheel is reduced compared to the case where an engine is used as a power source, which allows the behavior of the vehicle to be controlled in accordance with a change in the behavior of the vehicle without a significant delay. Note that the number of motors used may be the same as the number of wheels as in the present implementation, but only two motors, that is, one for the front wheels and the other for the rear wheels, may alternatively be used.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

Although, in the above-described implementation, for example, the yaw moment of the vehicle is controlled by controlling the driving forces of the wheels using the motors, the present invention is not limited to such an example. For example, the yaw moment of the vehicle may be controlled by controlling braking forces of the wheels using a brake in another implementation of the present invention.

Note that the steps illustrated in the flowcharts according to the above-described implementation may naturally be performed chronologically in the orders indicated in the flowcharts, but may not necessarily be performed chronologically. Some of the steps may be performed in parallel or independently of one another. It is also to be understood that even the steps performed chronologically can sometimes be changed in order as appropriate.

The invention claimed is:

1. A vehicle control apparatus, comprising:
    a controller that controls a vehicle including a front left wheel, a front right wheel, a rear left wheel and a rear right wheel, wherein the controller is configured to:
    execute a turn assist control that varies rear wheel braking/driving forces based on a yaw rate of the vehicle while the vehicle makes a turn by a yaw moment acting the vehicle corresponding to a steering operation of the vehicle, wherein the rear wheel braking/driving forces generate a vehicle additional yaw moment that acts the vehicle in a same direction with the yaw moment acting the vehicle corresponding to the steering operation of the vehicle, wherein the rear wheel braking/driving forces are generated by only the rear left wheel and the rear right wheel among the front left wheel, the front right wheel, the rear left wheel and the rear right wheel, and wherein the front left wheel and the front right wheel are braked/driven at front wheel braking/driving forces;
    determine whether the vehicle has a spin tendency or not;
    acquire a rotation rate of the front left wheel and a rotation rate of the front right wheel;
    acquire a first vehicle slip angle of the vehicle that is determined based on first information obtained from one or more sensors related to a velocity of the vehicle;
    acquire a second vehicle slip angle of the vehicle that is determined from a vehicle model of the vehicle; and
    determine the vehicle additional yaw moment based on a target yaw rate and an actual yaw rate, wherein the target yaw rate indicates a yaw rate calculated based on a steering wheel angle of the vehicle and a speed of the vehicle, and the actual yaw rate indicates a yaw rate detected by a sensor equipped in the vehicle;
    determine a first synchronization torque based on a first difference value that indicates a difference between the rotation rate of the front left wheel and the rotation rate of the front right wheel to decrease the first difference value; and
    execute, responsive to determining that the vehicle has the spin tendency while executing the turn assist control, a wheel braking/driving force control, wherein the wheel braking/driving force control includes:
        decreasing the vehicle additional yaw moment;
        determining corrected rear wheel braking/driving forces based on the decreased vehicle additional yaw moment;
        determining a second synchronization torque by varying the first synchronization torque based on a second difference value so that the first difference value is decreased in accordance with an increase of the second difference value, wherein the second difference value indicates a difference between the first vehicle slip angle and the second vehicle slip angle;
        determining corrected front wheel braking/driving forces based on the second synchronization torque;
        braking/driving the rear left wheel and the rear right wheel based on the corrected rear wheel braking/driving forces; and
        braking/driving the front left wheel and the front right wheel based on the corrected front wheel braking/driving forces.

2. The vehicle control apparatus according to claim 1, wherein the wheel braking/driving force control further includes:
    calculating rotation difference control amounts based on the first difference value and the first vehicle slip angle; and
    determining the second synchronization torque by decreasing the first synchronization torque based on the rotation difference control amounts.

3. The vehicle control apparatus according to claim 2, wherein the wheel braking/driving force control further includes correcting the rotation difference control amounts based on a last value among past values of the rotation difference control amounts.

4. The vehicle control apparatus according to claim 3, wherein the wheel braking/driving force control further includes correcting the rotation difference control amounts based on a current value of the rotation difference control amounts that is equal to or greater than the last value.

5. The vehicle control apparatus according to claim 4, wherein, when the rotation difference control amounts are smaller than the last value, the wheel braking/driving force control further includes adding, to each of the rotation difference control amounts, additional control amounts each of that is smaller than a difference between the current value and the last value.

6. The vehicle control apparatus according to claim 3, wherein, when the rotation difference control amounts are smaller than the last value, the wheel braking/driving force control further includes adding, to each of the rotation difference control amounts, additional control amounts each of that is smaller than a difference between a current value of the rotation difference control amounts and the last value.

7. The vehicle control apparatus according to claim 3, wherein the controller is further configured to:
    acquire a first difference between rotation rates of the rear left wheel and the rear right wheel, and a second difference between the rotation rates of the rear left wheel and the rear right wheel, wherein the first difference is determined from the vehicle model and the second difference is determined from second information obtained from at least one wheel rotation rate sensor;
    acquire a first yaw rate determined from the vehicle model, and a second yaw rate determined from third information obtained from a yaw rate sensor; and
    determine whether the vehicle has the spin tendency or not, based on a third difference between the first difference and the second difference, and a fourth difference between the first yaw rate and the second yaw rate.

8. The vehicle control apparatus according to claim 2, wherein the controller is further configured to:
    individually control motors that drive the rear left wheel and the rear right wheel based on of the rear wheel braking/driving forces or the corrected rear wheel braking/driving forces, individually control motors that drive the front left wheel and the front right wheel based on front wheel braking/driving forces or the corrected front wheel braking/driving forces, and wherein the rotation rate of the front left wheel and the rotation rate of the front right wheel are determined based on motor rotation rates of the motors that drive the front left wheel and the front right wheel.

9. The vehicle control apparatus according to claim 1, wherein the controller is further configured to;

acquire a first difference between rotation rates of the rear left wheel and the rear right wheel of the vehicle, and a second difference between the rotation rates of the rear left wheel and the rear right wheel, wherein the first difference is determined from the vehicle model and the second difference is determined from second information obtained from at least one wheel rotation rate sensor, acquire a first yaw rate determined from the vehicle model, and a second yaw rate determined from third information obtained from a yaw rate sensor; and determine whether the vehicle has the spin tendency or not, based on a third difference between the first difference and the second difference, and a fourth difference between the first yaw rate and the second yaw rate.

10. The vehicle control apparatus according to claim 1, wherein the controller reduces the first difference value in accordance with an increase of the first vehicle slip angle.

11. The vehicle control apparatus according to claim 1, wherein the controller varies the first synchronization torque by multiplying the first synchronization torque by a first adjustment gain that increases in accordance with the increase of the second difference value; and wherein the controller reduces the vehicle additional yaw moment by multiplying the vehicle additional yaw moment by a second adjustment gain.

12. The vehicle control apparatus according to claim 1, wherein the controller is further configured to:

individually control motors that drive the rear left wheel and the rear right wheel based on the rear wheel braking/driving forces or the corrected rear wheel braking/driving forces, individually control motors that drive the front left wheel and the front right wheel based on front wheel braking/driving forces or the corrected front wheel braking/driving forces, and wherein the rotation rate of the front left wheel and the rotation rate of the front right wheel are determined based on motor rotation rates of the motors that drive the front left wheel and the front right wheel.

13. The vehicle control apparatus according to claim 1, wherein the controller is further configured to increase, when determining that the vehicle has come to be without the spin tendency while executing the turn assist control after executing the wheel braking/driving force control, the decreased vehicle additional yaw moment in accordance with a decrease of the second difference value.

14. A method, comprising:

executing a turn assist control for a vehicle including a front left wheel, a front right wheel, a rear left wheel and a rear right wheel, wherein the turn assist control varies control amounts of rear wheel braking/driving forces based on a yaw rate of the vehicle while the vehicle makes a turn by a yaw moment acting the vehicle corresponding to a steering operation of the vehicle, wherein the rear wheel braking/driving forces generate a vehicle additional yaw moment that acts the vehicle in a same direction with the yaw moment acting the vehicle corresponding to the steering operation of the vehicle, and wherein the rear wheel braking/driving forces are generated by only the rear left wheel and the rear right wheel among the front left wheel, the front right wheel, the rear left wheel and the rear right wheel, and wherein the front left wheel and the front right wheel are braked/driven at front wheel braking/driving forces;

determining whether the vehicle has a spin tendency or not;

acquiring a rotation rate of the front left wheel and a rotation rate of the front right wheel;

acquiring a first vehicle slip angle of the vehicle that is determined based on first information obtained from one or more sensors related to a velocity of the vehicle;

acquiring a second vehicle slip angle of the vehicle that is determined from a vehicle model of the vehicle;

determining the vehicle additional yaw moment based on a target yaw rate and an actual yaw rate, wherein the target yaw rate indicates a yaw rate calculated based on a steering wheel angle of the vehicle and a speed of the vehicle, and the actual yaw rate indicates a yaw rate detected by a sensor equipped in the vehicle;

determining a first synchronization torque based on a first difference value that indicates a difference between the rotation rate of the front left wheel and the rotation rate of the front right wheel to decrease the first difference value; and executing, responsive to determining that the vehicle has the spin tendency while executing the turn assist control, a wheel braking/driving force control, wherein the wheel braking/driving force control includes:

decreasing the vehicle additional yaw moment;

determining corrected rear wheel braking/driving forces based on the decreased vehicle additional yaw moment;

determining a second synchronization torque by varying the first synchronization torque based on a second difference value so that the first difference value is decreased in accordance with an increase of the second difference value, wherein the second difference value indicates a difference between the first vehicle slip angle and the second vehicle slip angle;

determining corrected front wheel braking/driving forces based on the second synchronization torque;

braking/driving the rear left wheel and the rear right wheel based on the corrected rear wheel braking/driving forces; and braking/driving the front left wheel and the front right wheel based on the corrected front wheel braking/driving forces.

15. The method according to claim 14, further comprising increasing, when determining that the vehicle has come to be without the spin tendency while executing the turn assist control after executing the wheel braking/driving force control, the decreased vehicle additional yaw moment in accordance with a decrease of the second difference value.

16. A vehicle control apparatus, comprising:

circuitry configured to:

execute a turn assist control for a vehicle including a front left wheel, a front right wheel, a rear left wheel and a rear right wheel, wherein the turn assist control varies control amounts of rear wheel braking/driving forces based on a yaw rate of the vehicle while the vehicle makes a turn by a yaw moment acting the vehicle corresponding to a steering operation of the vehicle, wherein the rear wheel braking/driving forces generate a vehicle additional yaw moment that acts the vehicle in a same direction with the yaw moment acting the vehicle corresponding to the steering operation of the vehicle, wherein the rear wheel braking/driving forces are generated by only the rear left wheel and the rear right wheel among the front left wheel, the front right wheel, the rear left wheel and the rear right wheel, and wherein the front left wheel and the front right wheel are braked/driven at front wheel braking/driving forces;

determine whether the vehicle has a spin tendency or not;

acquire a rotation rate of the front left wheel and a rotation rate of the front right wheel;

acquire a first vehicle slip angle of the vehicle that is determined based on first information obtained from one or more sensors related to a velocity of the vehicle;

acquire a second vehicle slip angle of the vehicle that is determined from a vehicle model of the vehicle;

determine the vehicle additional yaw moment based on a target yaw rate and an actual yaw rate, wherein the target yaw rate indicates a yaw rate calculated based on a steering wheel angle of the vehicle and a speed of the vehicle, and the actual yaw rate indicates a yaw rate detected by a sensor equipped in the vehicle;

determine a first synchronization torque based on a first difference value that indicates a difference between the rotation rate of the front left wheel and the rotation rate of the front right wheel to decrease the first difference value; and execute, responsive to determining that the vehicle has the spin tendency while executing the turn assist control, a wheel braking/driving force control, wherein the wheel braking/driving force control includes:

decreasing the vehicle additional yaw moment;

determining corrected rear wheel braking/driving forces based on the decreased vehicle additional yaw moment;

determining a second synchronization torque by varying the first synchronization torque based on a second difference value so that the first difference value is decreased in accordance with an increase of the second difference value, wherein the second difference value indicates a difference between the first vehicle slip angle and the second vehicle slip angle;

determining corrected front wheel braking/driving forces based on the second synchronization torque;

braking/driving the rear left wheel and the rear right wheel based on the corrected rear wheel braking/driving forces; and braking/driving the front left wheel and the front right wheel based on the corrected front wheel braking/driving forces.

17. The vehicle control apparatus according to claim 16, wherein the circuitry is further configured to increase, when determining that the vehicle has come to be without the spin tendency while executing the turn assist control after executing the wheel braking/driving force control, the decreased vehicle additional yaw moment in accordance with a decrease of the second difference value.

* * * * *